United States Patent
Kashyap et al.

(10) Patent No.: US 9,769,199 B2
(45) Date of Patent: *Sep. 19, 2017

(54) CENTRALIZED STORAGE AND MANAGEMENT OF MALWARE MANIFESTS

(71) Applicant: Bromium, Inc., Cupertino, CA (US)

(72) Inventors: Rahul C. Kashyap, Foster City, CA (US); J. McEnroe Samuel Navaraj, Santa Clara, CA (US); Arun Passi, Sunnyvale, CA (US)

(73) Assignee: Bromium, Inc., Cupertino, CA (US)

( * ) Notice: Subject to any disclaimer, the term of this patent is extended or adjusted under 35 U.S.C. 154(b) by 18 days.

This patent is subject to a terminal disclaimer.

(21) Appl. No.: 14/954,853

(22) Filed: Nov. 30, 2015

(65) Prior Publication Data
US 2016/0099951 A1 Apr. 7, 2016

Related U.S. Application Data

(63) Continuation of application No. 13/932,465, filed on Jul. 1, 2013, now Pat. No. 9,203,862, which is a continuation-in-part of application No. 13/708,492, filed on Dec. 7, 2012, now Pat. No. 9,223,962, and a
(Continued)

(51) Int. Cl.
| | |
|---|---|
| *H04L 29/06* | (2006.01) |
| *G06F 21/55* | (2013.01) |
| *G06F 21/56* | (2013.01) |
| *G06F 11/14* | (2006.01) |

(52) U.S. Cl.
CPC ........ *H04L 63/145* (2013.01); *G06F 11/1405* (2013.01); *G06F 21/55* (2013.01); *G06F 21/552* (2013.01); *G06F 21/564* (2013.01); *G06F 21/566* (2013.01)

(58) Field of Classification Search
CPC ...... G06F 21/56; G06F 21/566; G06F 21/564; G06F 21/567; G06F 21/568; G06F 21/552; G06F 21/554; G06F 21/125; G06F 21/51; G06F 21/561; G06F 21/563; G06F 2221/2115; G06F 2221/2149
See application file for complete search history.

(56) References Cited

U.S. PATENT DOCUMENTS

| | | | |
|---|---|---|---|
| 6,732,125 B1 * | 5/2004 | Autrey ................ | G06F 11/1466 707/640 |
| 6,886,099 B1 * | 4/2005 | Smithson .............. | G06F 21/554 709/206 |

(Continued)

*Primary Examiner* — Tae Kim
(74) *Attorney, Agent, or Firm* — Brokaw Patent Law PC; Christopher J. Brokaw

(57) ABSTRACT

Updating a central repository with information about malware resident upon a computer system. Upon detecting the malware executing in a virtual machine, a software module, without manual instruction, sends malware manifest data to a central repository over a network. The malware manifest data may comprise a copy of the malware and all versions, including temporary versions, of any files written to, updated by, or accessed by the malware. The central repository may receive, over a network from at least two computer systems, distinct sets of malware manifest data and may subsequently store the sets of malware manifest data.

20 Claims, 12 Drawing Sheets

Related U.S. Application Data continuation-in-part of application No. 13/708,703, filed on Dec. 7, 2012, now Pat. No. 9,092,625.

(60) Provisional application No. 61/667,900, filed on Jul. 3, 2012.

(56) References Cited

U.S. PATENT DOCUMENTS

| | | | | |
|---|---|---|---|---|
| 6,898,715 | B1* | 5/2005 | Smithson | H04L 12/58 713/187 |
| 7,392,544 | B1* | 6/2008 | Pavlyushchik | G06F 21/562 713/187 |
| 8,011,010 | B2* | 8/2011 | Michael | G06F 21/562 726/22 |
| 8,341,749 | B2* | 12/2012 | Rogel | G06F 21/56 726/22 |
| 8,978,139 | B1* | 3/2015 | Banerjee | H04L 63/1416 726/24 |
| 2004/0107226 | A1* | 6/2004 | Autrey | G06F 11/1466 |
| 2006/0272017 | A1* | 11/2006 | Largman | G06F 11/1417 726/22 |
| 2008/0059726 | A1* | 3/2008 | Rozas | G06F 21/53 711/156 |
| 2008/0263658 | A1* | 10/2008 | Michael | G06F 21/562 726/22 |
| 2009/0089879 | A1* | 4/2009 | Wang | G06F 21/53 726/24 |
| 2010/0122343 | A1* | 5/2010 | Ghosh | G06F 21/55 726/23 |
| 2010/0328064 | A1* | 12/2010 | Rogel | G06F 21/56 340/540 |
| 2012/0072968 | A1* | 3/2012 | Wysopal | G06F 11/3612 726/1 |
| 2012/0079596 | A1* | 3/2012 | Thomas | G06F 21/55 726/24 |
| 2012/0144489 | A1* | 6/2012 | Jarrett | G06F 21/566 726/24 |

\* cited by examiner

CENTRALIZED STORAGE AND MANAGEMENT OF MALWARE MANIFESTS

CLAIM OF PRIORITY AND RELATED APPLICATION DATA

This application is a continuation of, and claims priority to, U.S. Pat. No. 9,203,862, patent application Ser. No. 13/932,465, filed Jul. 1, 2013, entitled "Centralized Storage and Management of Malware Manifests," invented by Rahul C. Kashyap et al., the contents all of which are hereby incorporated by reference for all purposes as if fully set forth herein.

U.S. Pat. No. 9,203,862 is a continuation-in-part of and claims priority to U.S. non-provisional patent application Ser. No. 13/708,492, filed Dec. 7, 2012, entitled "Micro-Virtual Machine Forensics and Detection," invented by Rahul C. Kashyap et al., and is a continuation-in-part of and claims priority to U.S. non-provisional patent application Ser. No. 13/708,703, filed Dec. 7, 2012, entitled "Micro-Virtual Machine Forensics and Detection," invented by Rahul C. Kashyap et al., both of which claim priority to U.S. provisional patent application No. 61/667,900, filed Jul. 3, 2012, entitled "Virtual Machine Forensics and Detection," invented by Gaurav Banga et al., the contents all of which are hereby incorporated by reference for all purposes as if fully set forth herein.

FIELD OF THE INVENTION

Embodiments of the invention relate to centrally storing and managing information about observed malware process behavior in a virtualized computing environment.

BACKGROUND

A great deal of time, money, and effort is spent in the fight against security risks, such as viruses, malware, exploits, intrusions, and other dangers to enterprise computing. A malware infection may require a compromised system to be erased and re-imaged to remove the malware, which can also result in great expenditures of time and money as well as loss of productivity.

While terms such as viruses, malware, and exploits may have specific definitions in the art, as used herein the term "malware" shall refer to any type of computer code and/or other data introduced from outside a computer system or network of computers that may be used to damage or otherwise cause aspects of the computer system or network of computers to malfunction or perform in an unintended manner. Thus, as used herein, the term "malware" encompasses viruses, exploits, worms, and any type of programmatic security risk.

Malware may be introduced into a computer network through a wide variety of avenues, such as email or a malformed JPEG or other code on a web page that is downloaded to a computer via a web browser. Malware generally follows a common lifecycle; namely, the malware will exploit a weakness in the computer system or network, the malware will drop and execute a payload, the malware will attempt to escalate its privileges, the malware will take steps to persist on the system and/or network despite efforts to remove it, and finally the malware will propagate to other computers.

Current approaches to battle malware attempt to detect malware prior to the infection phase and/or exploitation phase. If the malware is unable to be detected using current approaches, then countermeasures cannot be enacted and systems may become infected.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Figure 1:
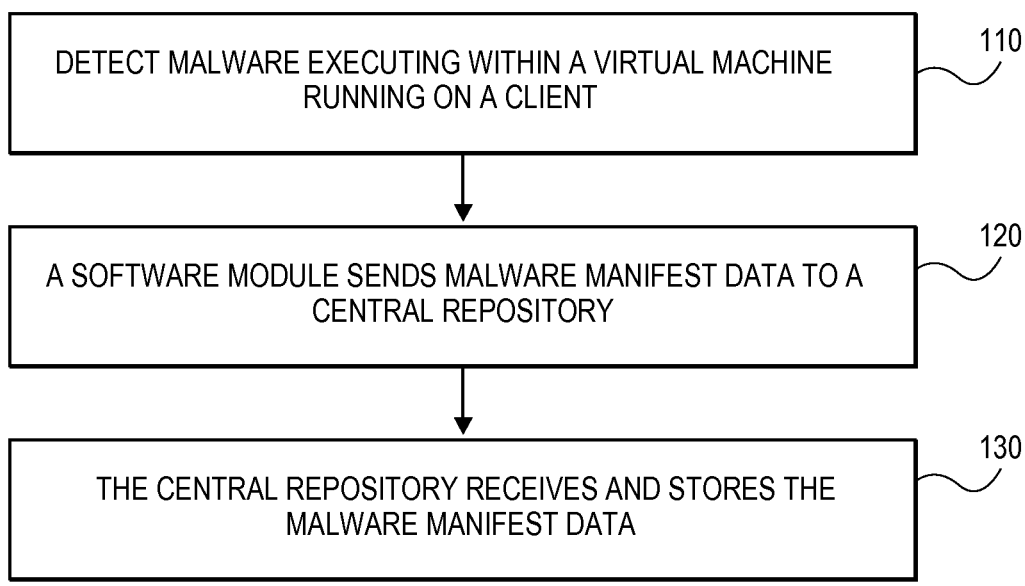
FIG. 1 is a flowchart illustrating the steps of a client informing a central repository about malware executing within a virtual machine running on the client according to an embodiment of the invention.

Approaches for centrally storing and managing information about observed malware process behavior occurring within a virtualized computing environment are presented herein. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form or discussed at a high level in order to avoid unnecessarily obscuring teachings of embodiments of the invention.

Functional Overview

The approaches described herein are directed towards the collection and management of information about malware detected upon a computer system. This information may be analyzed to better understand the nature of a malware attack so that appropriate countermeasures may be enacted.

Embodiments of the invention may be implemented upon a client. A client may employ one or more virtual machines (VMs) that each executes its own operating system. An individual process (or task) executing on the client may execute within its own VM that is instantiated specifically for the execution of the process. For example, each tab of a web browser or each of several word processing documents may be executing within a VM that has been created solely for the individual process and the VM will be destroyed upon completion of the process (e.g., closing the tab/document). As opposed to current non-virtualized operating systems, each process executing on a client may be monitored on a granular basis. The particular behavior of a single process executing in a VM may be analyzed to determine whether the process is taking action that deviates from what is known to the computer system to be normal behavior for the process. Once a process or task is detected having deviant behavior, steps may be taken to protect the client, as well as the enterprise as a whole, against threats posed by the deviant process or task.

Once malware is detected executing in a virtual machine running on a particular client, the client may notify an entity (a "central repository") responsible for overseeing the operation of many clients that malware has been detected on that client. Indeed, in certain embodiments, each client may even provide to the central repository a copy of the malware itself and any information necessary to safely recreate the execution of the malware in a controlled environment. A client may notify the central repository of the malware in an automated manner, i.e., without explicit instruction from a user.

Notifying the central repository in an automated manner is advantageous for a variety of reasons. The information stored and maintained in the central repository provides visibility into the actual activity transpiring within a virtual machine infected with malware. By analyzing this information collected from a plurality of clients, vulnerabilities present across an enterprise's deployed clients may be discovered and appropriate countermeasures may be enacted. By reviewing the data stored in the central repository, one better understand the nature of the malware, e.g., one can determine how many clients were affected by the malware, when the malware was introduced, where did the malware come from, and which type of users are being attached by particular types of malware.

Overview of a Client

Figure 2:
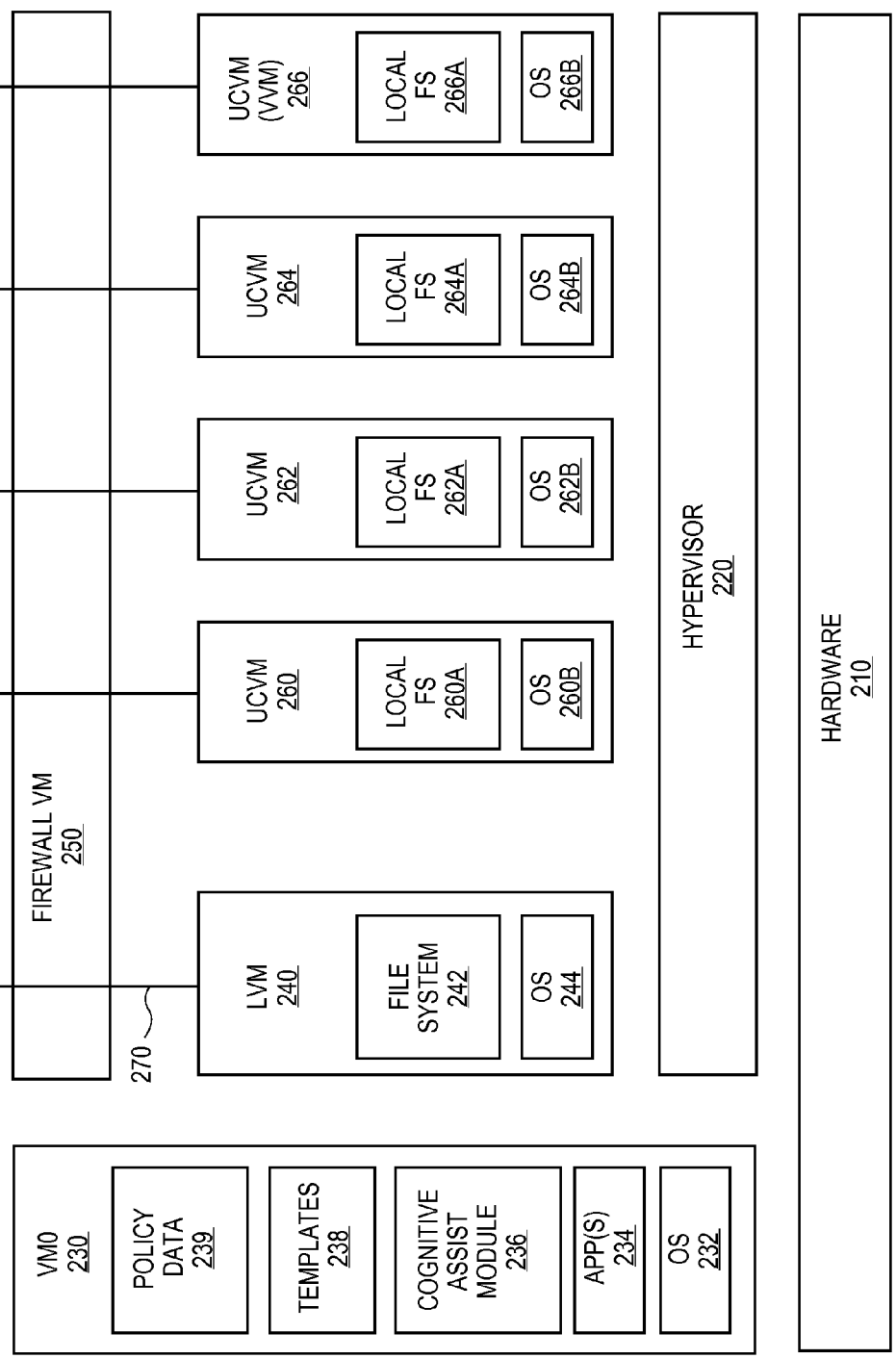
FIG. 2 is an block diagram of the functional components of one embodiment of the invention.

A virtual machine forensics and malware detection tool of an embodiment may be implemented upon a computer system. A computer system of an embodiment includes a number of independent virtual machines (VMs) that each executes a full operating system (OS). A block diagram of client 200 according to one embodiment of the invention is shown in FIG. 2. The term "client," as broadly used herein, represents any type of Internet endpoint or computer system capable of connecting to a network and executing a virtual machine. Non-limiting, illustrative examples of client 200 include a PC, a laptop computer, a tablet computer, a cell phone, a personal digital assistant (PDA), and the like.

In an embodiment, client 200 may correspond to a server. Thus, while use of the term "client" in other contexts might exclude an interpretation that includes a server, as broadly used herein, client 200 may be embodied on a wide variety of machines, one example of such being a server. Thus, as the Applicant may be his or her own lexicographer, as used herein, the term client 200 expressly includes a server. For example, non-limiting, illustrative examples of client 200 include a web server, an application server, a file server, and a cloud server. Indeed, implementing embodiments of the invention upon a server may yield many benefits. The micro-virtualization techniques employed by embodiments provide an efficient mechanism for eliminating the risk of executing untrusted code and/or interpreting untrusted data in accordance with different policies to manage such risk. As such, a device, such as a server, which interacts with (a) numerous sources of untrusted code and/or data and/or (b) two or more corporate entities having different policies towards managing the risk of untrusted code and/or data, may benefit from embodiments of the invention.

Client 200 includes a number of virtual machines (such as 230, 240, 250, and 260, for example) that execute on hardware 210 of client 200. The various VMs within client 200 may be used for separately executing processes associated with different activities. One such VM, namely "VM0" (i.e., VM0 230 of FIG. 2), is secured so that VM0 may serve as the root of trust with a guaranteed integrity. VM0 may contain core operating system 232 and one or more applications 234. In the embodiment shown in FIG. 2, VM0 is not accessible over any network, such as the Internet. As shall be explained below, VM0 provides a secure environment in which operating system 232 and one or more applications 234 may execute without risk of exposure to malicious code.

Other VMs, such as VMs 260, 262, 264, and 266 in FIG. 2, may be created, maintained, and destroyed on-demand using a very efficient micro-virtualizing hypervisor 220. Using efficient micro-virtualization techniques, the latency of starting and stopping activities or applications which run in their own VM in embodiments is very low, thereby providing a practical user experience while employing full OS virtualization.

Embodiments address and overcome many disadvantages experienced by modern general-purpose computer systems that execute code from different sources and of differing trust levels; nevertheless, embodiments maintain compatibility with current typical real-world usage of computer systems by corporate and non-corporate users. This is so because any activity which is not previously deemed trustworthy is performed in a separate VM by certain embodiments, and so all code which may be potentially malicious is executed in its own VM that is destroyed after its immediate use is ended, thereby preventing any malicious code from effecting any lasting change to a computer system according to an embodiment of the invention.

The Trusted Virtual Machine

VM0

In an embodiment of the invention, a special virtual machine, referred to herein as "VM0," is created to be a trusted and un-hackable portion of a computer system. FIG. 2 depicts VM0 230 according to an embodiment. To achieve the property of being un-hackable, VM0 230 may be permanently disconnected from any network (i.e., VM0 230 is not connected to any local network or the Internet). Specifically, VM0 230 may not contain any type of networking stack, such as a TCP/IP network stack, and may not have access to any networking hardware that could allow for communication between VM0 230 or any applications 234 executed thereby and the Internet. Thus, the only way to install software onto VM0 230 is to have physical custody of client 200 and manually install the software on VM0 230.

Thus, in certain embodiments, one or more applications 234 executing within VM0 230 do not have any access to a network, must be fully self contained in their functionality, and must rely only on local code and data for all their functionality. All applications that need to access the network will therefore need to run in a separate virtual machine outside of VM0 230, as shall be described in further detail below. It is envisioned that the software (such as one or more applications 234) running in VM0 230 be selected at the time client 200 is manufactured or first configured for use in a controlled environment. Because VM0 230 is never connected to any type of network, such as a TCP/IP network, all common types of network initiated attacks cannot be waged against VM0 230, thereby rendering VM0 230 immune to such attacks and safe as compared to any computer or VM that is connected to the Internet.

In an embodiment where hypervisor 220 is a Type 2 hypervisor, when client 200 is booted, only VM0 230 is started by the BIOS or firmware of client 200. Once VM0 230 is running, VM0 230 can start hypervisor 220 immediately or on demand. In another embodiment, where hypervisor 220 is a type 1 hypervisor, hypervisor 220 is first started by the BIOS when client 200 is booted and VM0 230 is launched by the Hypervisor 220. Hypervisor 220 is a software component that is responsible for creating other VMs which each execute independent instances of the operating system. These additional VMs are instantiated by VM0 230 and/or hypervisor 220 to run any untrusted code or code that needs to access the network. Untrusted code in this context is any code that has not been pre-approved as being trusted by an IT administrator of client 200. The additional VMs are started "silently" and automatically by client 200, e.g., these VMs are started transparently to the user and without the user having to do anything explicit. These additional VMs are also not explicitly visible to the user; instead, all the user sees on the desktop is familiar objects (such as icons, windows, and applications) without any indication that multiple VMs are executing in client 200. Embodiments of the invention follow rules that govern what application activities are assigned to which particular VM. These rules are described below in greater detail.

In another embodiment (not depicted in FIG. 2), VM0 230 may have a networking stack that is firewalled off from the network using well-tested firewall software, thereby allowing VM0 230 to have access to a computer network. Such an embodiment may only allow connections with a specific Internet system so that the software inside VM0 230 may be updated from a designated update server. For example, the firewall software may only allow VM0 230 to connect to one or more servers associated with the IT administrator of client 200 and may prevent VM0 230 from establishing a connection with any other endpoint on any network.

Interaction with a User Interface

All code responsible for generating a user interface (UI) not associated with an application may be maintained in VM0 230. Consequently, all UI interaction activity with the desktop between a user and software executing on client 200 may take place between the user and VM0 230, which maintains a unified desktop for all applications running in all VMs. Interaction between the user and applications running in VMs other than VM0 230 takes place indirectly via VM0 230. For example, when the user enters a password for a web site whose browser and HTML/Javascript code is running in an untrusted VM, the password is first directly provided to VM0 230, which then transfers the information to the untrusted VM. Furthermore, the untrusted VM's display is rendered on to a virtualized display, which is then composed into the VM0 230 desktop (as appropriate) by controlling code running in VM0 230. As code executing in VM0 230 is trusted, the user may trust any user interface controls displayed on a screen since all code responsible for rendering the user interface is trusted.

This approach is quite different from prior systems where often the code that controls the full desktop experience is untrusted. Consequently, if the code responsible for generating the user interface is corrupted by malware, then the user interface may be used as a tool to deceive the user. For example, malware may cause a user interface control to be displayed that requests the user to submit an authentication credential that will be used for improper purposes by the malware. However, this problem is overcome by embodiments of the invention—since all code responsible for rendering user interface controls executes in VM0 in an embodiment, malware is prevented from hijacking or corrupting UI-rendering code.

Figure 7:
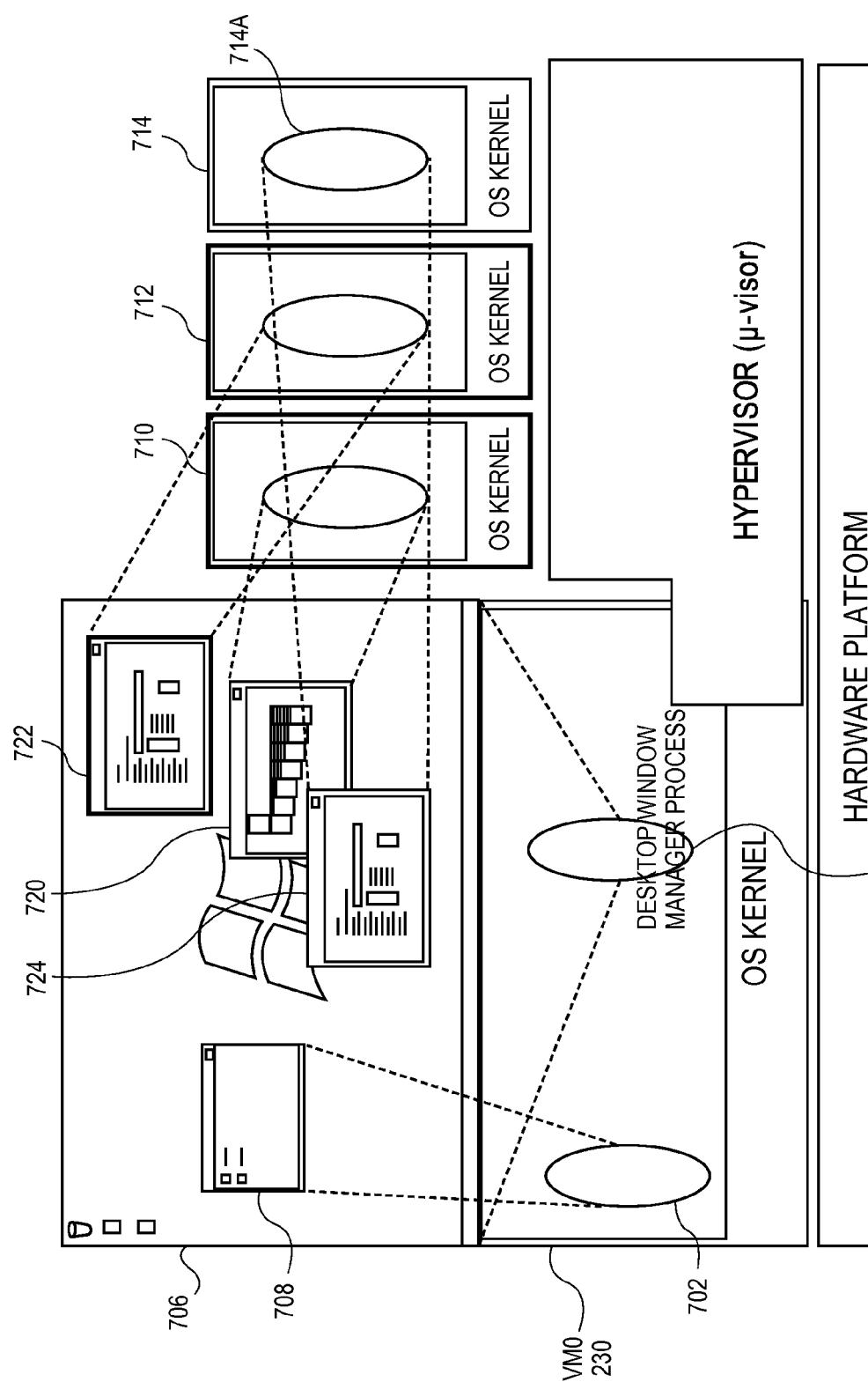
FIG. 7 is an illustration of exemplary desktop of a client according to an embodiment of the invention.

To illustrate an embodiment of the invention, consider FIG. 7, which is an illustration of exemplary desktop of client 200 according to an embodiment. As shown in FIG. 7, process 704 is responsible for rendering desktop 706 on a physical display of client 200. Process 714A runs in untrusted VM 714 and does not have complete access to the file system of client 200. When any process inside VM 714 requests access to the file system of client 200, it is intercepted and process 702 is responsible for rendering a window 708 depicting the contents of the file system of client 200. Process 702 has the option of selectively displaying which contents are available to the VM 714 based on policies as set forth by the IT administrator or the user. VM 710 in FIG. 7 that runs the solitaire game is implemented such that the display of VM 710 is a virtualized display, which is then composed into the desktop 706 (as appropriate) by controlling process 704 running in VM0 230. The displays of VMs 712 and 714 are rendered on the desktop 706 in a similar fashion.

The Legacy Virtual Machine

LVM

FIG. 2 depicts a legacy virtual machine (LVM) 240 according to an embodiment of the invention. LVM 240 may contain operating system 244. LVM 240 serves as the primary entity being managed by the IT administrator of client 200. As such, LVM 240 provides an environment that is analogous to the managed enterprise OS of corporate computer system in that an IT department may install and maintain various enterprise applications within operating system 244 of LVM 240. In an embodiment, operating system 244 of LVM 240 may correspond to a Microsoft Windows OS or any other general purpose OS such as Linux or MacOS.

In an embodiment, LVM 240 is responsible for storing the main file system 242 of client 200. File system 242 may contain the user's profile folder containing the user's settings and files.

LVM 240 typically only runs infrastructure OS programs and programs that are used for the purpose of managing client 200 and trusted enterprise applications. Other user programs (especially those that involve external components or consume untrusted data) do not run in LVM 240, but instead, run elsewhere in separate VMs (such as a UCVM as described in more detail below).

In an embodiment, the network access of LVM 240 is restricted to just the corporate network as implemented by firewall VM 250. Firewall VM 250 is a specialized virtual machine that comprises firewall software/applications to restrict network access of VMs running in client 200 to appropriate and/or necessary network access points. Such practice is consistent with the need for only the responsible IT administrator to be capable of connecting to LVM 240 to manage LVM 240 and processes executing therein.

In one embodiment, LVM 240 and VM0 230 may be implemented in a single virtual machine.

Untrusted Code Virtual Machine

UCVM

When a user wishes to run any application that requires access to either a network or untrusted data (untrusted data is any data that originates from outside client 200), the application is run inside a dedicated VM that is created on-demand by hypervisor 220. This dedicated VM is called an Untrusted Code Virtual Machine (or UCVM). FIG. 2 depicts several UCVMs, namely UCVM 260, 262, 264, and 266. A UCVM operates under the assumption that, in general, any code that connects to the network and interacts with arbitrary code executing on an external device may at some point be compromised. This assumption also applies to trusted applications that interact with data originating from outside the computer system executing the trusted application, because such data may, at some point, contain embedded malicious code. To address such possibilities, such applications are executed in a UCVM to prevent any malicious code, inadvertently introduced into the UCVM, from having the capacity to affect any change outside of the UCVM.

In an embodiment, a UCVM is created by (a) cloning a copy of LVM 240, or a stripped-down version of LVM 240, in memory and (b) providing access to a restricted file system to the newly created UCVM. For example, UCVM 260 comprises restricted file system 260A, UCVM 262 comprises restricted file system 262A, and UCVM 264 comprises restricted file system 264A. Each UCVM possesses its own instance or copy of the operating system, which is isolated and separate from the main operating system (including its code and data) executing within VM0 230 or LVM 240. For example, UCVM 260 comprises operating system 260B, UCVM 262 comprises operating system 262B, and UCVM 264 comprises operating system 264B.

To provide a low latency user experience, UCVMs may not be booted from scratch each time an application is needed to be started. Instead, a UCVM may be created very quickly by cloning the UCVM from a template VM (with a booted OS) that has been pre-loaded in memory at system boot time. In an embodiment, the template used to clone a UCVM may be selected from templates 238 stored in VM0 230. A variety of techniques can be employed to make this cloning operation as fast as a few 100 milliseconds. Multiple types of templates may be used by a system to create UCVMs depending the nature and type of application(s) to be run inside the UCVM, as discussed in greater detail below in the section entitled "Cloning a UCVM from a Template."

Cognitive assist module 236 is software that is responsible for implementing the rules and policies of embodiments as well as helping the user of client 200 in understanding and navigating the security model employed by client 200 on an as-needed basis. Cognitive assist module 236 helps decide what activities run in which UCVMs, including when VMs are created or destroyed, and what kind of access to network and file system resources each UCVM has. Cognitive assist module 236 also helps protect the user, e.g., when a user is fooled by malware running in a UCVM and is in the process of providing some information that they have previously provided to enterprise code running in LVM 240 (for example a password), then cognitive assist module 236 may detect this situation and prevent the user from providing the information (which may be secret corporate information) to the malware.

Regarding the restricted file system of each UCVM, each UCVM has access to a private copy of a subset of the files in file system 242 on client 200. A UCVM may only have access to those files which the UCVM should need for the correct operation of the application executing therein. For example, user files are usually not required for correct operation of an application executing in a UCVM and thus are not typically exposed to a UCVM. On the other hand, if a UCVM is created as a result of the user wishing to edit a document using an application, such as MS Word, then a copy of the document the user wishes to edit will be provided to the restricted file system of the UCVM at the time the UCVM is created. Advantageously, using UCVM 260 as an example, if a process executing within UCVM 260 makes any changes to any files in restricted file system 260A, then these changes do not impact the files stored in file system 242 maintained in LVM 240 because such changes are only made to restricted file system 260A maintained in the UCVM and are not propagated, without express consent from the user, to file system 242 maintained by LVM 240.

In a typical use case of a UCVM, the UCVM may run a local application or an individual web page session. When a user is done running the local application or navigates away from a web page to another page with a different Internet URL domain, the corresponding UCVM is destroyed. Any new local application or web application will be run inside a brand new, separate UCVM that is cloned again from a clean UCVM master template. Thus, if there has been any compromise to the UCVM during the course of running some malicious code that was introduced into the UCVM, then the adverse affects of the security breach are isolated to only the affected UCVM and are lost when the UCVM is destroyed.

For example, assume that a user double-clicks on a MS Word document icon in Windows Explorer. Embodiments create a special UCVM to run the MS Word process. In a particular embodiment, cognitive assist module 236 of VM0 230 may dynamically create the UCVM using a template in one or more templates 238 or use a pre-existing template in memory or on the disk. The template selected by cognitive assist module 236 may be selected based on what activity is to occur within the UCVM, i.e., the selected may be designed to create a UCVM having characteristics that are optimal for running a text editor therein. The created UCVM contains a copy of the operating system as well as a restricted (local) copy of the file system. This local copy of the file system in the UCVM contains all the usual Windows and Program files; however, the user's profile folder in the local copy of the file system contains only the single target MS Word document being opened.

As another example, assume that three tabs are open in a web browser and further assume that each tab is open at a different web page. In consideration of the code which may be contained or embedded on a web page, each web page may be properly considered a web application. In embodiments of the invention, the code responsible for rendering the user interface (UI) of the web browser runs in VM0 230. On the other hand, executable code for the three web applications runs in three separate UCVMs. A core HTML/Javascript engine runs in each of the three UCVMs. A copy of the file system within each of the three separate UCVMs does not contain any part of the user's files, as they are not required for the task performed by each UCVM, namely displaying a web page. Thus, each web application (or web page in this example) is completely isolated from the rest of the system.

In an embodiment, a UCVM may be connected to the Internet according to an access policy determined by the nature of the code running within the UCVM. To illustrate, web pages are typically restricted as per a strict "same origin policy" similar to the rules implemented by modern web browsers. In the "same origin policy," scripts running on web pages are permitted to access methods and properties of other scripts originating from the same site with no specific restrictions, but are prevented from accessing most methods and properties across web pages on different sites. Untrusted native applications running outside of the web browser are restricted by default to be able to connect only to the domain from which the program was downloaded (and to specific content delivery networks (CDNs) that may be in use by the domain in question).

This level of network access for downloaded applications can be explicitly changed (increased or decreased) by the end-user to include additional sites on the Internet. End-user control over what a UCVM can connect to may be subject to certain limitations related to corporate networks and sensitive web sites (such as a bank and web mail provider). For example, any code running in a UCVM may not, in general, access any site on a corporate Intranet to which client 200 is connected. Applications that need to connect to the corporate Intranet may need to be signed by the IT administrator of the domain. Similarly, non-web untrusted application code in a general UCVM may not connect to a web site associated with a search engine or bank or other sites that may have been previously identified as being "off limits." These connections can only be made through a web browser (which spawns UCVMs bound to these special domains) or from a special purpose LVM called a VVM, which described in further detail below.

In an embodiment, there is no communication channel available for an application running in one UCVM to communicate with an application running in another UCVM. Thus, applications running in UCVMs are completely isolated from each other and from the other applications in the system. This is well suited for running downloaded third party local applications which are generally designed to be self-contained or for Internet applications (web pages are not supposed to rely on any communication between applications within the web browser). In an alternate embodiment, communication between an identified set of virtual machines can be enabled by a person with sufficient privileges, such as an IT administrator for client 200.

Firewall Virtual Machine

In an embodiment, the implementation of the network access restrictions is done in a dedicated VM called a firewall VM. FIG. 2 depicts an exemplary firewall VM 250 of an embodiment. Firewall VM 250 runs an isolated operating system with a dedicated and fixed set of firewall applications that implement the network access policy for all VMs in client 200 (except perhaps VM0 230, which may not have any network access). Firewall VM 250 may provide, to any virtual machine running on client 200 in which untrusted code is executed or untrusted data is being interpreted, restricted access to only those network resources deemed necessary on an as-needed basis in accordance with a policy described by policy data stored on client 200.

In another embodiment of the invention, the firewall functionality of the system may be co-located and implemented inside either the hypervisor 220 of FIG. 2, or inside the LVM 240 of FIG. 2 (working in conjunction with the hypervisor 220 of FIG. 2), or inside VM0 230 of FIG. 2 (working in conjunction with the hypervisor 220 of FIG. 2).

Validated Virtual Machines

VVMS

UCVMs are not appropriate to run local applications that interact heavily with each other using local APIs such as COM, as typically there is no communication channel available for an application running in one UCVM to communicate with an application running in another UCVM. Embodiments may employ one (or more) special UCVMs called a Validated Virtual Machine (VVM) for the purpose of running relatively trusted local applications that have complex interactions between the applications. Such complex interactions are common in enterprise frameworks containing multiple applications, such as Microsoft's Office Suite and IBM's Lotus Notes.

FIG. 2 depicts an exemplary VVM 266 of an embodiment. Note that while FIG. 2 depicts a single VVM for ease of explanation, other embodiments of the invention may employ two or more VVMs or no VVMs based upon the particular needs of the user and/or policies of the organization responsible for or the owner of client 200.

Applications need to be signed and configured for co-location in the same VM by an administrator of client 200 before they can run in VVM 266. Inside VVM 266, signed applications can interact with each other using all types of APIs and frameworks supported by the OS being used. In an embodiment, the default network access policy of a VVM is to allow access to a corporate network only. The IT administrator may increase or decrease this level of access, subject to certain restrictions.

In an embodiment, specific signed applications or suites (groups of applications) that originate from a trusted source (other than the enterprise) may also be designated to run together in a particular VVM responsible for applications originating from that source. For example, all non-corporate applications that are signed by a specific vendor may be run together in a single VVM. These applications would then be isolated from corporate applications and general untrusted applications, but not from one another. A specific network access rule that is more permissive than the "same origin policy" used for web applications and unsigned applications may be used for a VVM. The restricted copy of file system 242 exposed to a VVM is similar to that exposed to a generic UCVM in that the restricted copy of file system 242 exposed to a VVM comprises only those files related to, or required for, performance of the applications executing within the VVM.

The Restricted File System Exposed to a VM

Figure 3:
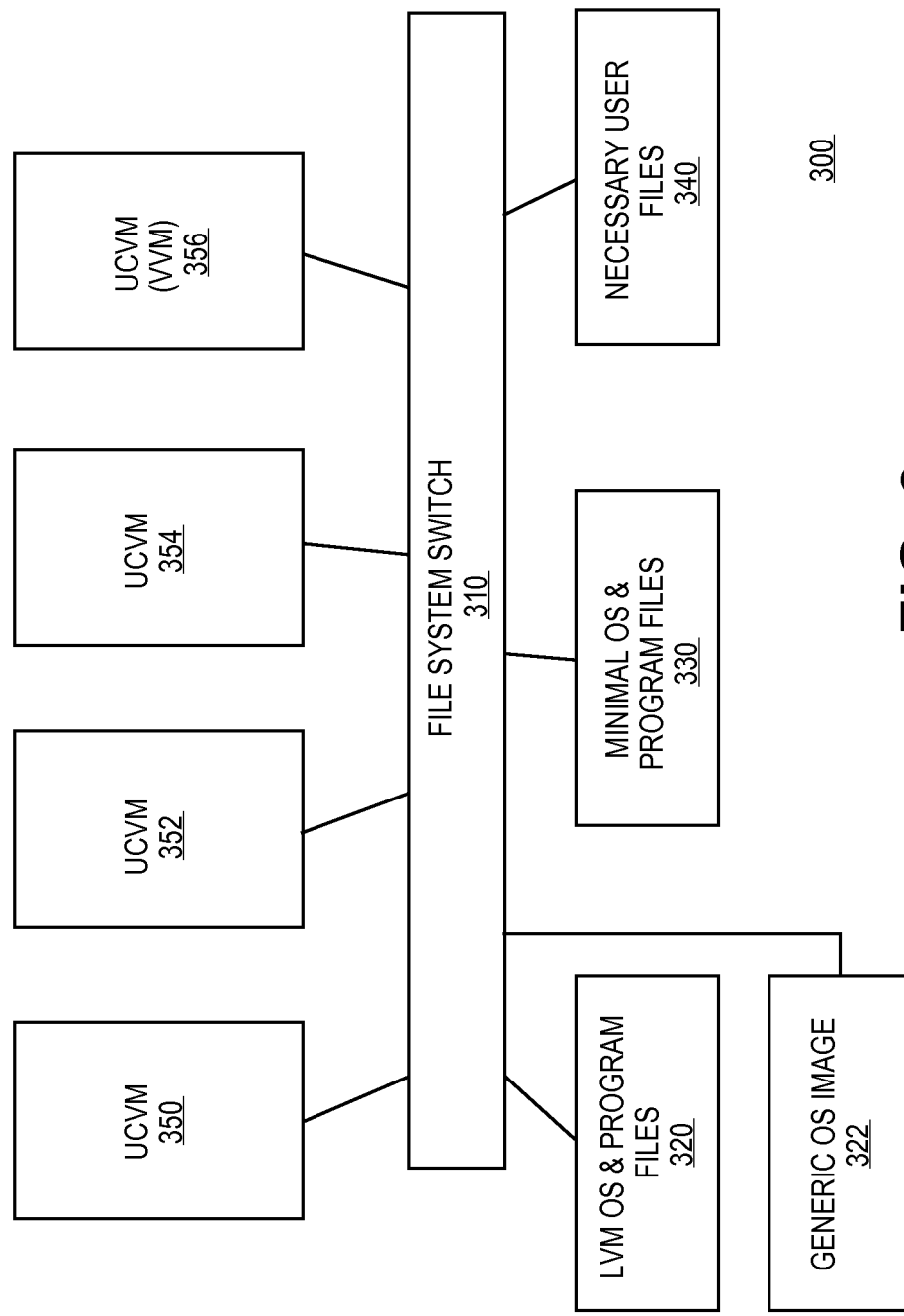
FIG. 3 is block diagram of the functional components involved in exposing a restricted copy of the file system to different UCVMs (and VVMs) according to an embodiment of the invention.

FIG. 3 is block diagram of the functional components involved in exposing a restricted copy of file system 242 to different UCVMs (and VVMs) according to an embodiment of the invention. File System Switch 310 is software that is configured to provide the newly created UCVM with access to a copy-on-write clone of the OS image that the UCVM was created from once the UCVM has started. The minimal operating system and program files 330 in the copy-on-write clone may be created from either the corporate LVM OS image 320 or a separate generic stripped down OS image 322 which may be created by the IT administrator.

Furthermore, a newly created UCVM is provided a copy of necessary user files 340, which are a subset of the user files in file system 242. The composition of necessary user files 340 will be different for each user. The set of files comprising the user files in file system 242 maintained in LVM 240 are typically those files in the user's home folder, e.g., c:\Users\<username>. The particular copies of files that are provided to a particular UCVM as necessary user files 340 are the minimum set of files that are needed by that UCVM to accomplish what the user intended to do as captured when the target application was being invoked. For example, if the user double clicked on a specific MS Word file named ABC.docx at the location c:\Users\<username>\Documents in the file system 240 maintained in LVM 240, then necessary user files 340 would only include a copy-on-write clone of the ABC.docx file and only this copy-on-write clone of the ABC.docx file is made available in the virtual c:\Users\<username>\Documents folder made visible to the newly created UCVM running the MS Word application. If a program (like MS Word) were started without any association with a file, then necessary user files 340 would correspond to an empty c:\Users\<username>\Documents virtual folder.

Any application running in a UCVM therefore only has access to the particular set of user files provided explicitly by the user when the program was invoked. Subsequently, if the user wants to browse file system 242 for another file from within the application (for example, by using the File->Open menu item of MS Word), then he or she will see a restricted user files directory.

Figure 4:
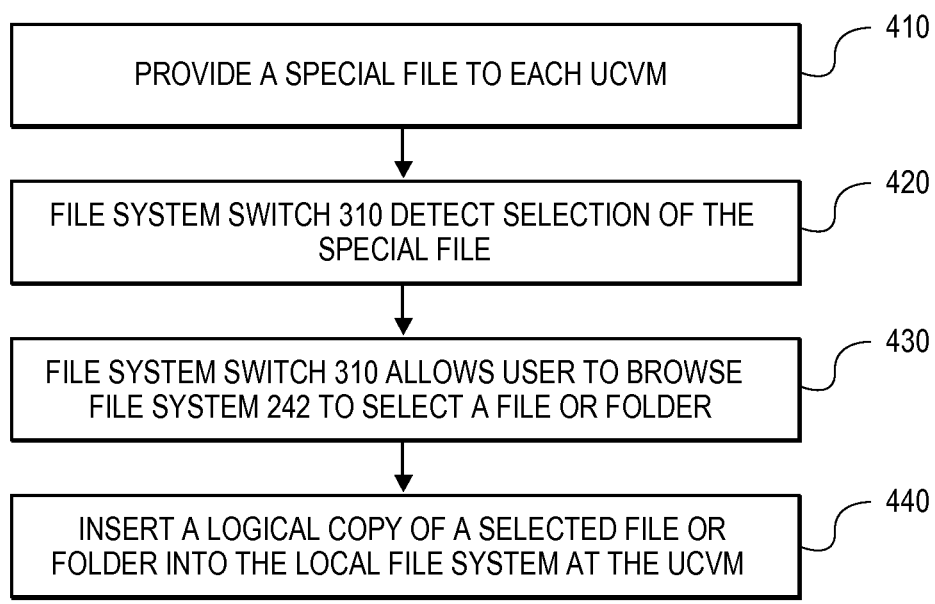
FIG. 4 is a flowchart illustrating the steps involved in a UCVM obtaining a copy of a new user file maintained in the file system stored elsewhere according to an embodiment of the invention.

To enable the user to select files from the user's own User Files folder in file system 242 maintained in LVM 240 using an application executing within an UCVM, a user interface may be provided to allow the user to browse his or her files in file system 242, select one or more of the user files, and expose a copy of the selected files to the appropriate UCVM. For example, FIG. 4 is a flowchart illustrating the steps involved in a UCVM obtaining a copy of a new user file maintained in file system 242 according to an embodiment of the invention. In step 410, a special file is provided to each UCVM. The special file may be provided to the UCVM in a number of different ways, e.g., the special file may be inserted into each folder of the virtual C:\Users\<username> directory provided to each UCVM. This special file may be named something akin to "Show All My Files" or the like, as its selection will be used to trigger exposing additional copy-on-write clones of files stored in file system 242 to the UCVM.

In step 420, File System Switch 310 detects when the special file is selected by the user. For example, when a program executing within a UCVM browses to the special file, presumably as a result of a user click, this action may be trapped by File System Switch 310.

In step 430, File System Switch 310 invokes a dialog with LVM 240 that allows the user to browse the full file system 242 maintained in LVM 240. The user may then select a file or folder in file system 242. Note that at this stage, the user may be granted read access to the full file system 242 for purposes of selecting a file or folder, but the user is not granted write access to file system 242. Therefore, the user is prevented from modifying file system 242 maintained by LVM 240 in any way.

In step 440, after the user selects a file or folder, a copy of the selected file or folder is created. The copy of the selected file or folder is then inserted into the restricted file system associated with the UCVM. As a result of inserting the copy of the selected file or folder in the restricted file system associated with the UCVM, an application executing in the UCVM may have read and write access to the copy of the selected file or folder in the virtual file system, but is prevented from effecting any change to the original copy of the selected file or folder in file system 242 maintained by LVM 240.

The steps of FIG. 4 ensure that files in file system 242 maintained by LVM 240 are not visible to a UCVM without explicit permission from the user. Malicious code running in a UCVM, for example, cannot programmatically access files in file system 242 in LVM 240. Further, malicious code running in a UCVM also cannot render a false user interface to trick the user into unintentionally providing any user files to the malicious code, since all code responsible for rendering the user interface is maintained within VM0 230, and thus, unreachable and un-hackable by the malicious code.

File System Switch 310 may be implemented in a variety of ways. For example, in one embodiment, File System Switch 310 may be implemented by a network file system protocol (NFS or CIFS may be used). A special VM (or LVM 240) may be used as the OS serving the "User Files" shared file system. Other VMs "mount" this shared file system using NFS or CIFS (or another network file system) from the hosting VM. Application software in the hosting VM may decide what files are exposed to which VM based on instructions provided by VM0 230.

In another embodiment, File System Switch 310 may be implemented, in part, by a proprietary protocol for handling communications between the different UCVMs and File System Switch 310. File System Switch 310, in such an embodiment, may be implemented as part of a special VM or in LVM 240.

Cloning a UCVM from a Template

In an embodiment of the invention, every virtual machine created in client 220 is instantiated using a template selected from one or more templates 238 stored in VM0 230. In an embodiment, each template in one or more templates is either immutable or may be updated in a very controlled fashion.

Each of one or more templates 238 may be used to instantiate or create a virtual machine with different characteristics or operational parameters. The characteristics or operational parameters described by a template may be configured, tailored, or suited for a particular context or type of processing activity. For example, each template may specify what type of code is to be run within a virtual machine created using the template, a size of the virtual machine created using the template, firewall settings for the virtual machine created using the template, what type of virtual machine (for example, a VVM, UCVM, or a LVM) is the be created using the template, how changes to a local file system within the virtual machine created using the template are to be persisted, and what portion, if any, of the network can a virtual machine created using the template access.

One or more devices internal to client 200 or externally connected to client 200 may interact with one or more processes executing in a virtual machine within client 200. In an embodiment, a template may assign responsibility for a selected set of devices to a virtual machine created using the template. In other embodiments, responsibility for a selected set of devices may be assigned to a particular virtual machine by virtue of policy data stored on client 200. Such policy data may describe one or more policies provided to client 200 from an owner or responsible organization of client 200. Policy data of this nature may be maintained by VM0 230 or LVM 240, for example, in certain embodiments.

In an embodiment, one or more templates 238 may be arranged in a hierarchy such that there is a root node corresponding to a template having a default set of characteristics. The root node may have one or more child nodes, and each of these child nodes may be associated with a template that inherits the properties of the parent template, but contains additional or changes properties associated with that child node. Naturally, each child node may also have children, and so the hierarchy of templates may be an arbitrary number of levels deep, where each template inheriting characteristics of its parent, but yet each template is capable of further defining or changing characteristics that distinguishes the template over its parent.

Branches of the hierarchy of templates may be associated with, or more particularly suited, different types of activity. For example, certain templates may be associated with corporate activity, and may therefore specify characteristics related to virtual machines running corporate applications. Similarly, certain templates may be associated with the user's personal application's activity or Internet/Web related activity, and may therefore specify characteristics related to virtual machines running the user's own applications or Internet/Web applications respectively.

Figure 5:
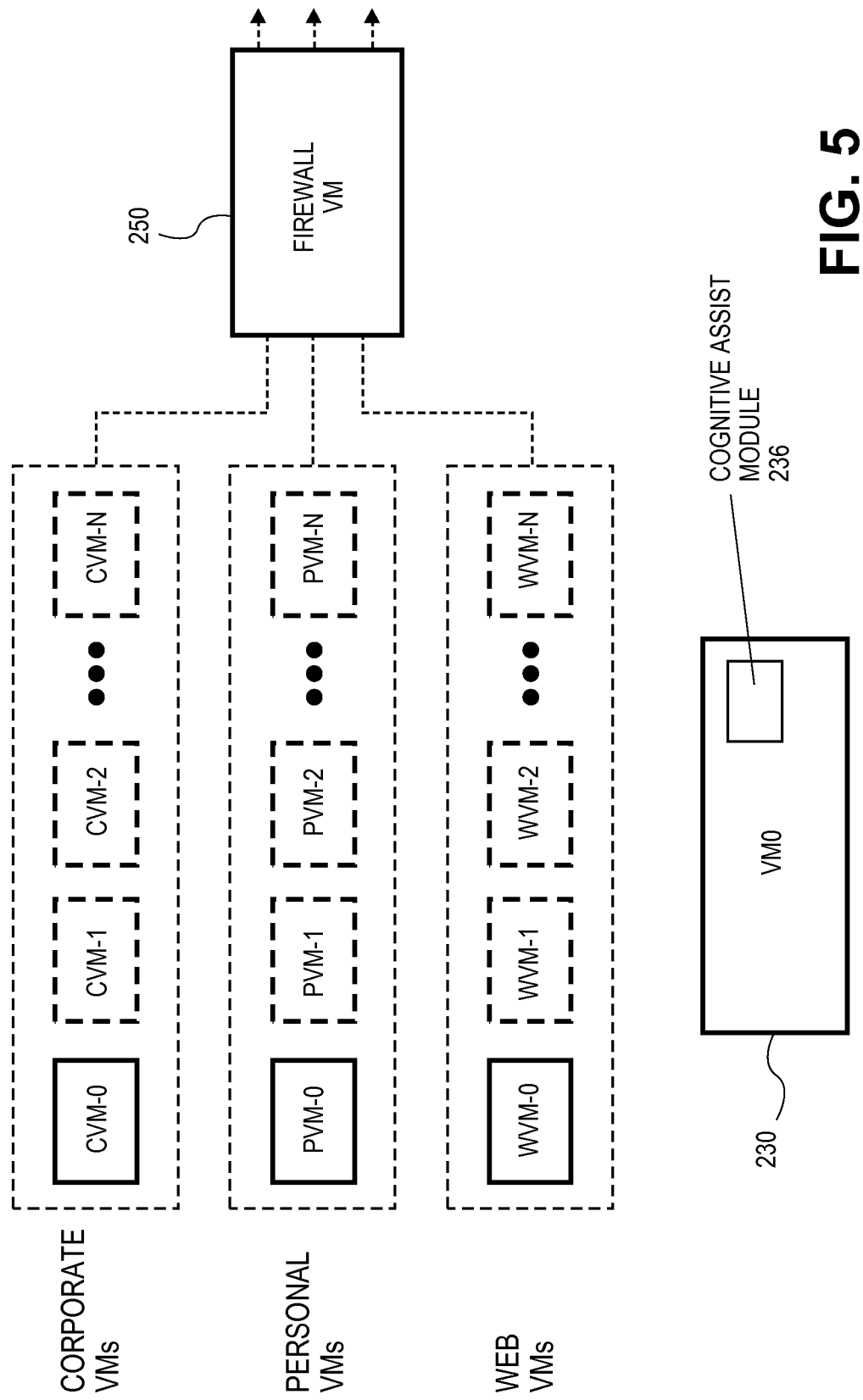
FIG. 5 is an illustration of instantiating a plurality of different virtual machines using different templates according to an embodiment of the invention.

FIG. 5 is an illustration of instantiating a plurality of different virtual machines using different templates according to an embodiment of the invention. In FIG. 5, CVM-0 represents a template that defines a virtual machine having characteristics suitable for running a corporate application, PVM-0 represents a template that defines a virtual machine having characteristics suitable for running a user application (non-corporate), and WVM-0 represents a template that defines a virtual machine having characteristics suitable for running an Internet application. Other embodiments of the invention may define a variety of other templates to define different types of templates. In the example of FIG. 5, cognitive assist module 236 in VM0 230 may use CVM-0 to instantiate one or more corporate virtual machines, such as CVM-1, CVM-2, etc. Similarly, cognitive assist module 236 may use PVM-0 to instantiate one or more personal (non-corporate) virtual machines, such as PVM-1, PVM-2, etc., and cognitive assist module 236 may use WVM-0 to instantiate one or more web-based virtual machines, such as WVM-1, WVM-2, etc. As depicted in FIG. 5, each instantiated UCVM connects to an external network through Firewall VM 250. Cognitive assist module 236 can either create these templates on demand or create and store them while monitoring the usage of the client.

Installation of Software

In the normal operation of a typical PC, a fair amount of after-market software is installed. Such after-market software installed on a PC generally falls into one of two categories, namely (a) validated software (packages or straight executables) installed by the IT administrator of the PC or (b) end-user installed software (including web browser plugins & extensions, more complex software packages that go through an explicit install phase, and straight executables that can be executed without an explicit installation phase). Note that end-user installed software may be signed (by a verifiable, known vendor) or unsigned.

In embodiments of the invention, installation of validated software is performed as is normally performed today. The IT administrator can manage corporate validated software using embodiments using similar procedures as performed today, except that such corporate validated software are installed in LVM 240 (or if need be, VVM 266).

With respect to end-user installed software, IT administrators have two choices for how they would like to handle this type of installation using embodiments of the invention. The first choice is for the IT administrator to lock down client 200 by disallowing any installation of end-user installed software. While this is a safer operating decision, this approach may reduce the end-user's productivity because the end user cannot take advantage of applications that may be otherwise useful that have not yet been validated by the IT administrator. The IT administrator may provide installation support on an individual and as-needed basis whenever a user wishes to install any end-user installed software; however, doing so will increase the cost of support by the IT administrator.

The second choice is for the IT administrator to allow the user to install end-user installed software him or herself using features provided by embodiments of the invention. End-user installed software may include browser plugins, browser extensions, signed and unsigned installation packages, and straight executables. Browser plugins are installed into an installed browser plugin database that is maintained in a particular UCVM. The installed browser plugin database may be implemented, in an embodiment, using file and registry diff store 820 shown in FIG. 8, which is an illustration of safely installing an untrusted application according to an embodiment of the invention of the invention. During installation of a plugin, the installed browser plugin database is also updated to record the domain that was used to initiate the plugin install. Presumably, this is the web page that contains an element or component that requires the plugin to render the complete content in the web page. Subsequently, the web browser loads an installed plugin into a web HTML/JS engine instance (which runs inside a UCVM) only if the domain of the web page to be displayed by the UCVM matches a domain, recorded in the plugin database, associated with the installed plugin. A plugin that is used by multiple sites is installed only once, but is associated with multiple domains. Popular plugins like Flash may be pre-installed in certain embodiments.

Browser extensions may be installed into a web browser's extension database that is maintained in a particular UCVM. During runtime, browser extensions are treated like web applications in that each browser extension is run inside its own UCVM. In an embodiment, the web browser extension database and the installed browser plugin database may be implemented in the same database in a single UCVM.

Signed installation packages may be run and the resulting installation may update either the LVM image or the Generic Windows image based on a policy set by the IT administrator.

Figure 8:
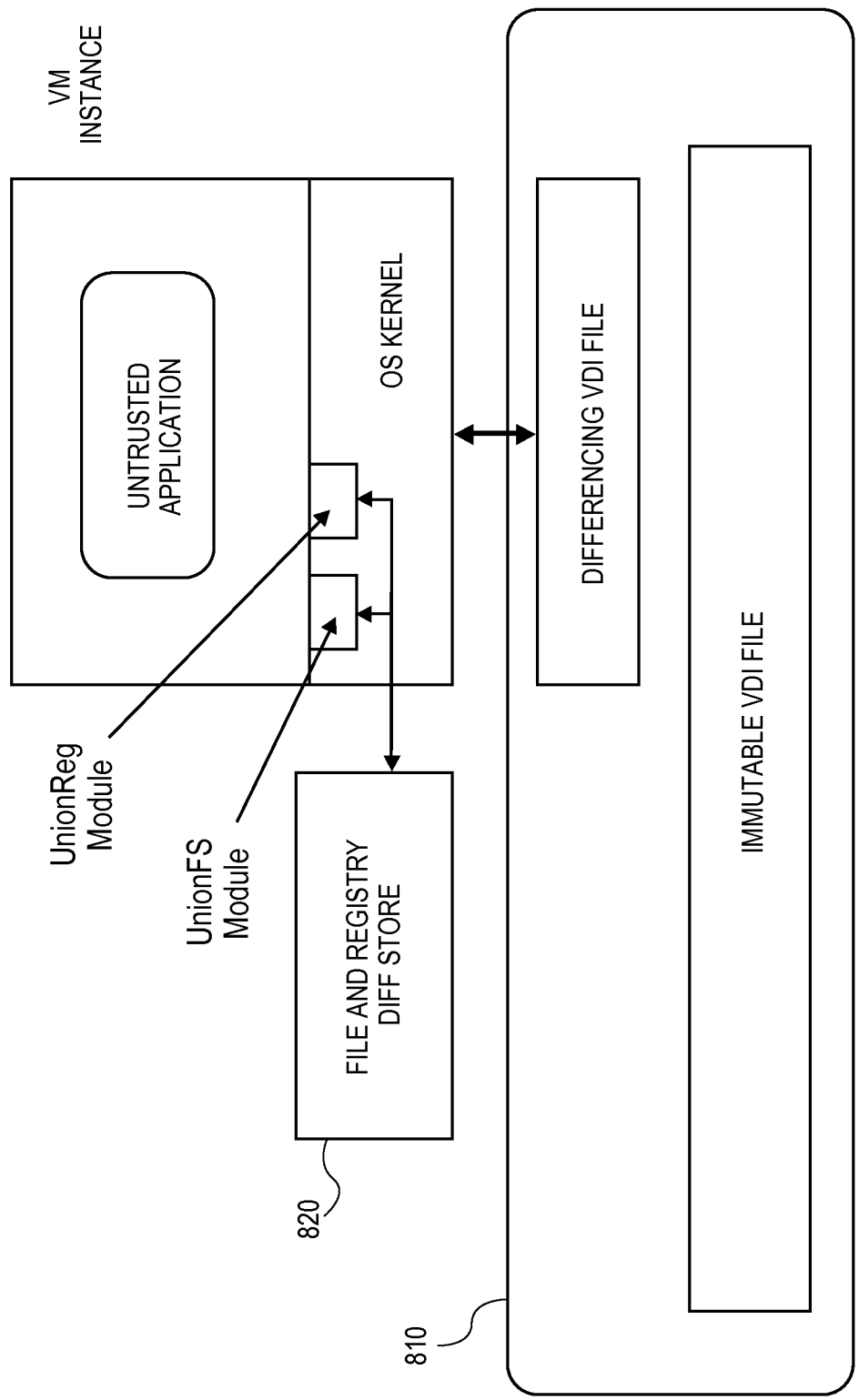
FIG. 8 is an illustration of safely installing an untrusted application according to an embodiment of the invention of the invention.

Unsigned installation packages go through a virtual install. The virtual installation of unsigned installation packages will be described with reference to FIG. 8, which is an illustration of safely installing an untrusted application according to an embodiment of the invention of the invention. A registry and program files change set is created and stored in file and registry diff store 820. Start-menu and desktop changes by the installer are captured in a special folder which contains desktop and start menu items for all user-installed applications. Subsequently, if an unsigned application is run, it is run in a UCVM cloned from the Generic Windows image all by itself. Virtual disk 810 in FIG. 8 is the normal virtual disk of the UCVM. DiffStore 820, which further virtualizes the file system and the registry as seen by the applications of UCVM, is typically implemented as a separate module outside of the normal block level virtual disk store.

Signed and unsigned executables may be run in a UCVM. Such a UCVM may be created on demand and destroyed after its use is ended by embodiments.

Managing Web Cookies and Caches

A web cookie (or simply "cookie") is a piece of text stored on a user's computer by their web browser. A cookie can be used for authentication, storing web site preferences, shopping cart contents, the identifier for a server-based session, or anything else that can be accomplished through storing text data.

While the actual cookie itself is not visible to the user, the user would notice a difference in the user experience of interacting with a web site if cookies could not be saved between visits to the web site. Accordingly, embodiments of the invention provide mechanism to store cookies before a UCVM is destroyed, so that the next time the user visits the web site using a web browser running in a different UCVM, any cookies that have been stored and are associated with that web site may be injected into the new UCVM.

Similarly, to provide the best user experience, it would be advantageous to carry over the cache of a web browser for a particular web domain from one UCVM to the next, so that the next time the user visits the web domain using a different UCVM, there is no a delay in displaying content due to an unpopulated cache. Thus, embodiments of the invention provide mechanism to store the web cache of a web browser for a web domain before a UCVM is destroyed, so that the next time the user visits the web site using a web browser running in a different UCVM, the cache of the web browser need not be warmed (i.e., repopulated), as the cache in the new UCVM has been updated to contain all the objects the cache previously contained in the prior, and now destroyed, UCVM used to visit the web domain.

To provide a concrete example with reference to the example of FIG. 2, assume that a user initially transparently uses UCVM 260 to run a web browser to visit web site A. When UCVM 260 is destroyed, any cookies and cache files are extracted and saved. Thereafter, assume the user transparently uses UCVM 262 to run a web browser to visit web site B. As web site B is hosted by a different web domain than web site A, the previously stored cookies and cache files associated with web site A will not injected into UCVM 262. Thereafter, if UCVM 262 is destroyed, then any cookies and cache files are extracted and saved. At a later point in time, if the user thereafter transparently uses UCVM 264 to run a web browser to visit web site A, then the previously stored cookies and cache files associated with the web domain of web site A will be injected into UCVM 264. This allows the web browser running in UCVM 264 to visit web site A to appear, to the user, to have the same state of the prior web browser used to visit web site A, even through different virtual machines are used between visits. Note that no portions of the file system are saved between visits to a web site; only the state of the web session is saved.

In one embodiment, the cookies and cache information is captured in Diff Store 820 associated with the URL of the website. In each visit to the same URL, the UCVM utilizes the same Diff Store presenting the cookies and caches to the UCVM. In another embodiment, the cookies and cache files can be captured at the end of the session and saved to the client system's core file system in a special folder. On visiting the same URL again, the cookies and cache can be re-injected into the file system of the UCVM.

Efficient Physical-to-Virtual Disk Conversion

Platform virtualization is performed on a given hardware platform by host software (a control program), which creates a simulated computer environment, a virtual machine, for its guest software. A hypervisor, also called virtual machine manager (VMM), is one of many hardware virtualization techniques that allow multiple operating systems, termed guests, to run concurrently on a host computer. The hypervisor presents to the guest operating systems a virtual operating platform and manages the execution of the guest operating systems. A guest OS executes as if it was running directly on the physical hardware. Access to physical system resources such as the network access, display, keyboard, and disk storage is suitably virtualized so that guest OS does not know these are virtual devices.

Generally, there are two types of hypervisors. Type 1 (or native, bare metal) hypervisors run directly on the host's hardware to control the hardware and to manage guest operating systems. A guest operating system thus runs on another level above the hypervisor. Type 2 (or hosted) hypervisors run within a conventional operating system environment. With the hypervisor layer as a distinct second software level, guest operating systems run at the third level above the hardware. In other words, Type 1 hypervisor runs directly on the hardware; a Type 2 hypervisor runs on another operating system, such as Windows. Embodiments of the invention may use any type of hypervisor. Thus, hypervisor 220 in FIG. 2 may either be a Type 1 or a Type 2 hypervisor.

A virtual disk image is a file on a physical disk, which has a well-defined (published or proprietary) format and is interpreted by a hypervisor as a hard disk. In terms of naming, a virtual disk image may have a specific file type extension, e.g., .vmdk for VMware VMDK, .vhd for Xen and Microsoft Hyper-V, and .vdi for Oracle VM VirtualBox.

There are two approaches employed for storage allocation by prior hypervisors, namely, (1) pre-allocate the entire storage for the virtual disk upon creation and (2) dynamically grow the storage on demand. In the former approach involving pre-allocation, the virtual disk may be implemented as either split over a collection of flat files (typically one is 2 GB in size) or as a single, large monolithic flat file. In the latter approach involving on-demand growth, the virtual disk may also be implemented using split or monolithic files, except that storage is allocated on demand.

There are two modes in which a disk can be mapped for use by a virtual machine. In a virtual mode, the mapped disk is presented as if it is a logical volume, or a virtual disk file, to the guest operating system and its real hardware characteristics are hidden. In a physical mode, also called the pass through mode, the hypervisor bypasses the I/O virtualization layer and passes all I/O commands directly to the disk.

A virtual machine (VM) is a software implementation of a machine (i.e. a computer) that executes programs like a physical machine. Virtual machines allow the sharing of the underlying physical machine resources between different virtual machines, each running its own operating system. The software layer providing the virtualization is called a hypervisor, such as hypervisor 220 in FIG. 2.

Virtual machines each require their own image of the operating system. The guest OS and host OS typically do not share the OS image, even if they are the same OS. This is problematic for several reasons. First, if a user wishes to run 10 different virtual machines, then she will require 10 different copies of the OS for the guest OSs, which requires an undesirable amount of storage to maintain. As she is already running one virtual machine at the host, the total number of different copies of the OS required would be 11. Second, the OS for a VM has to be created either by installing a new OS or shipping a copy of the OS from somewhere else, which is burdensome for those who do not have access to OS images. Further, it is also time consuming to install a new OS or ship an OS image, which is typically quite large. A third problem is that any software present in the host OS (such as a printer driver) will not be available in a guest OS unless it is installed again.

Shadow Copy (Volume Snapshot Service or Volume Shadow Copy Service or VSS) is a technology included in Microsoft Windows that allows taking manual or automatic backup copies or snapshots of data (termed "shadow copies"), even if it has a lock, on a specific volume at a specific point in time over regular intervals. VSS operates at the block level of the file system. Shadow Copy is implemented as a Windows service called the Volume Shadow Copy service. Software VSS provider service is also included as part of the Microsoft Windows OS to be used by Windows applications. Shadow Copy technology requires that the file system to be NTFS to be able to create and store shadow copies. Shadow Copies can be created on local and external (removable or network) volumes by any Windows component that uses this technology, such as when creating a scheduled Windows Backup or automatic System Restore point.

Snapshots have two primary purposes. First, they allow the creation of consistent backups of a volume, ensuring that the contents cannot change while the backup is being made. Second, they avoid problems with file locking By creating a read-only copy of the volume, backup programs are able to access every file without interfering with other programs writing to those same files. Through the integration between the Volume Shadow Copy Service, hardware or software VSS providers, application level writers and backup applications, VSS enables integral backups that are point in time and application level consistent without the backup tool having knowledge about the internals of each application. The end result is similar to a versioning file system, allowing any file to be retrieved as it existed at the time any of the snapshots was made. Unlike a true versioning file system, however, users cannot trigger the creation of new versions of an individual file, only the entire volume.

Figure 6:
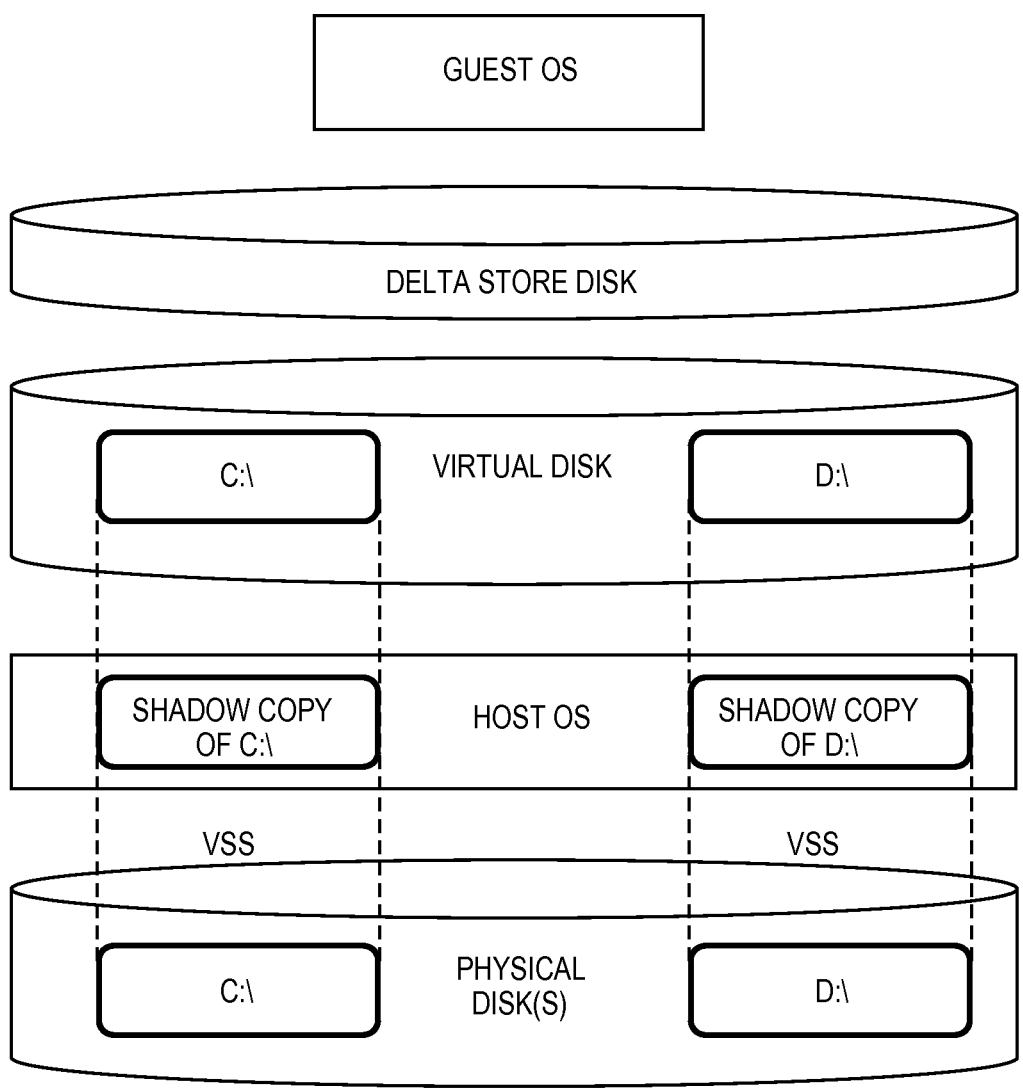
FIG. 6 is an illustration of a virtual disk based on VSS shadow copies according to an embodiment of the invention.

Embodiments of the invention overcome this limitation by creating virtual disks based on VSS shadow copies. FIG. 6 is an illustration of a virtual disk based on VSS shadow copies according to an embodiment. The virtual disk of FIG. 6 allows for many guest OSs running on the same host to share the same OS copy with the host OS. VSS shadow copies may be created fast and efficiently. Creating virtual disks on top of VSS is also a very fast operation, which means that VMs (with same OS as host OS) can be created very efficiently. Shadow copies are also maintained cheaply by windows OS by keeping the changes since the time shadow was created. Hence, the disk usage of multiple VMs is reduced substantially. VMs can also be maintained very efficiently since VSS snapshots can be updated once and have the changes reflected in all VMs. Since a VSS shadow copy contains all the software the user has installed on the machine at the time of the VSS shadow copy creation, virtual disks also receive access to all the software. Moreover, the version of the software, including any patches installed, is exactly the same. In addition to all the software, user documents are also visible to virtual machines. A virtual disk of an embodiment is an accurate point-in-time copy of host physical disk.

In an embodiment where VSS snapshots are read-only, a 'Delta Store Disk' may be attached to the virtual disk. The Delta Store disk is used to capture all the changes being made to the virtual disk.

Security Afforded by Embodiments

Embodiments of the invention provide a secure environment to prevent malicious code from affecting any lasting change in a computer system. Arbitrary code (either a web application or a native executable) runs inside an isolated operating system running on an isolated virtual machine. This code has no access to any other application (either a native application or a web application) being run by the user because those applications run in other operating systems running in separate virtual machines. Moreover, arbitrary code has access to only the specific part of the file system that is needed for correct execution of the code. Access to additional parts of the file system has to be provided by code that runs in VM0 (which is secure and fortified against unauthorized intrusion) and any increased access needs explicit authorization from the human user.

Specific trusted code that needs to interact in a complex way with other applications may be explicitly designated to run together inside the same designated VM. This type of VM also has limited access to the file system.

All code has limited network access to just what that code needs for its correct execution. All virtual machines are created from templates stored in VM0 which are either immutable or can be updated in a very controlled fashion. Consequently, if a security bug exists in a piece of code, the effect of the security bug is isolated ("space limited") because the compromised code has access to only a limited part of the file system, the network, devices, etc. Moreover, the effect of the security bug is "time limited" because the virtual machine that has been compromised will be subsequently discarded and a new virtual machine is created for future application instances from a clean immutable VM template.

Using Policy Data to Manage the Deployment of Virtual Machines

Embodiments allow code that originates from arbitrary external sources to be safely executed by a client. In this way, digital content of unknown trustworthiness may be safely received and potentially executed and/or interpreted by a client without incurring the risk that the digital content contains malicious code that could cause undesirable consequences.

The 'digital content' received by the client from an external source may correspond to any type of digital data, such as executable code or non-executable, interpreted data for example. Since malicious code may be carried within certain types of non-executable data and subsequently spread when the data is interpreted by applications, embodiments treat all incoming digital content as being capable of containing malicious code, even if the digital content is not in a recognized executable form. Non-limiting, illustrative examples of digital content include an ".exe" file, an application, a collection of applications designed to run together, a portion of an application, an email attachment, a slide presentation, a text document, and a web page (which essentially is a portion of an application, namely a web browser). Even though the email attachment, the slide presentation, and the text document, in and of themselves, are not executable files, embodiments of the invention treat these forms of digital content as potentially carrying malicious code.

To manage the risk posed by receiving digital content of unknown trustworthiness, any digital content received by a client is stored in one or more virtual machines. In an embodiment, digital content received from an external source may immediately be stored in one or more virtual machines upon receipt. Alternately, digital content received from an external source may be stored in an intermediate location, such as a local cache, prior to storing the digital content in a virtual machine.

While embodiments are configured to process all digital content originating from an external source in a virtual machine, the complexity of determining in which virtual machine the digital content should be stored and how that virtual machine should be configured is hidden from the user whenever possible or appropriate. To accomplish this goal, techniques are discussed herein for programmatically managing a plurality of virtual machines on the client to accommodate the wide variety of use cases for receiving digital content at a client. However, in some cases, explained in more detail below, it may be appropriate to inform the user of certain activity concerning a virtual machine, such as when obtaining express permission from the user is advisable before performing an action.

Certain sources of digital content are more trustworthy than other sources. For example, the web site of a bank or Fortune 500 company may be more trustworthy than the web site of a smaller company or lessor known organization. Also, applications may have different operating needs, e.g., certain applications may be designed to work closely with other applications or require access to network resources. Thus, in an embodiment, the attributes of each virtual machine are specifically tailored to reflect the type of digital content and/or applications operating or stored therein.

To illustrate how one embodiment operates, when a client determines that digital content, originating from an external source, is to be received or processed by the client, the client may identify, without human intervention, one or more virtual machines, executing or to be executed on the client, into which the digital content is to be received. To do so, the client may consult policy data, such as policy data 239 stored at client 200 of FIG. 2, to determine a placement policy, a containment policy, and a persistence policy used in identifying the one or more virtual machines into which the digital content is to be received.

The policy data may be used to specifically tailor the operation of each virtual machine to reflect the type of digital content and/or applications operating or stored therein. The placement policy identifies a particular virtual machine into which the digital content is to be stored, the containment policy identifies what network resources and client resources the particular virtual machine can access, and the persistence policy identifies whether data (or a part of it) stored in the particular virtual machine is persistently stored. Naturally, the placement policy, containment policy, and persistence policy are, to a certain extent, intertwined, as the resources a virtual machine may access and whether data stored therein is persisted will affect what applications/digital content are appropriate to reside therein.

In an embodiment, each of the placement policy, the containment policy, and the persistence policy may consider a variety of different factors. For example, the placement policy, the containment policy, and/or the persistence policy may consider a historical record of use for the client in identifying a virtual machine. The evaluation of a policy may involve consulting a historical record of how the client, or applications running thereon, has been used. In this way, if a particular action has been judged to be more safe (or less safe) over a period of time, the manner in which the action is handled by the policy may evolve over time. To illustrate, in an embodiment, if a particular network resource, such as an affiliate corporate web page, is demonstrated to be sufficiently safe over a period of time, then this web page may be processed using relaxed restrictions, e.g., by a web browser in a virtual machine already handling another trusted web page as opposed to instantiating a new virtual machine to handle the affiliate corporate web page. On the other hand, if the historical record of use demonstrates that an action involving a particular network resource or client resource may pose some risk to the client, then the policy may subsequently handle this action more sensitively than before, e.g., by assigning code to handle the particular network resource or client resource in a dedicated virtual machine with restricted access to client and network resources.

As another example of the types of factors which may be considered by a policy, one or more of the placement policy, the containment policy, and the persistence policy may consider a current physical location of the client or to which networks the client currently has access in identifying one or more virtual machines which should be used to receive content. In this way, which networks are available to the client, the IP address assigned to the client, the current location of the client based on global positioning service (GPS) data, and the current location of the client based on an IP address or which networks are available to the client may all be considered when determining which virtual machine should receive digital content and what restrictions should be placed on that virtual machine. In this way, when the client is physically located in an area deemed safe (such as a work office or home), digital content received by the client may be handled by a virtual machine having a set of lesser restrictions than when the client is physically located in an unknown area.

As another example of the types of factors which may be considered by a policy, one or more of the placement policy, the containment policy, and the persistence policy may consider the proximity of the client to a wireless device, such as a Bluetooth enabled cell phone. For example, if the client is not within a configurable distance to the cell phone of the user of the client, then the client may receive digital content using a set of greater restrictions, e.g., code executing in all virtual machines may be denied access to certain client resources and/or all network resources. Embodiments may determine whether the client is within a configurable distance to a wireless device using a variety of different methods, such as accessing the wireless signal strength between the client and the wireless device.

In an embodiment, at least a portion of the policy data, used in identifying one or more responsible virtual machines to receive digital content, is obtained from a remote server after the client determines that digital content is to be received from an external source. In this way, policy data may be sent, as needed, from an IT administrator to the client. The client may treat any policy data already residing on the client in the same manner as policy data retrieved from a remote server. For example, when a user of the client performs an action, the client may consult a remote server to see if the remote server has any additional policy data regarding this action. Following this procedure, an IT administrator can maintain a high level of control on how the client will manage virtual machines running on the client. This enables the IT administrator to make adjustments to the security model followed by the client in real-time. The client may interact with a human operator at a remote location to obtain additional policy data or may interact with a remote automated system, without human intervention, to obtain the additional policy data. Note that certain embodiments may be configured to consult a remote server for policy data only when a certain configurable action is taken. Therefore, in certain embodiments, the client need not always contact a remote server to determine if additional policy data is available each time that the client is to receive new digital content.

In an embodiment, the policy data may specify that the virtual machine assigned to receive digital content can only access a limited subset of the metadata properties for a client resource or a network resource. For example, a virtual machine may not be capable of determining what local wireless networks are available in the vicinity or whether the network card of the client is of a particular type. In this way, the amount and type of information exposed to a particular virtual machine may be controlled to a fine level of granularity.

Use of the placement policy, the containment policy, and the persistence policy by certain embodiments will be discussed in further detail below.

Placement Policy

The placement policy identifies a particular virtual machine into which the digital content is to be stored. The particular virtual machine identified by a placement policy in which digital content is to be stored may be an existing virtual machine or a new virtual machine that has not yet been instantiated. In the case where the placement policy specifies that the digital content should be received by a virtual machine that has not yet been instantiated, either the placement policy itself or some other location in the policy data will identify a template for use in instantiating the particular virtual machine. The identified template will describe characteristics of a virtual machine suitable for receiving the digital content.

The placement policy may weigh a variety of different considerations in determining which virtual machine should store the digital content so that the digital content may be safely executed, interpreted, and/or processed. For example, a placement policy of an embodiment may assign any file having a certain name or certain attributes to a virtual machine having certain characteristics. To illustrate, a placement policy may indicate that all signed executable files from an internal organization or company are to be assigned to a virtual machine having a specified set of characteristics. As another example, the placement policy may instruct untrusted applications to execute in separate virtual machines so that each untrusted application is isolated from other applications and data of the client.

The placement policy of an embodiment may identifies a plurality of classes of virtual machines, where each class of the plurality of classes is associated with a different trust level for external sources of digital content. Code executing in a virtual machine cannot access external sources associated with less trustworthy external sources of digital content. For example, assume there are three classes of virtual machines, where the first class of virtual machines is designed to run web browsers accessing web sites of financial institutions and email providers, the second class of virtual machines is designed to run web browsers accessing web sites of Fortune 500 companies, and the third class of virtual machines is designed to run web browsers accessing all other web sites. In this example, a web browser executing in a virtual machine that is associated with the third class cannot access any web sites from Fortune 500 companies or financial institutions and email providers. Similarly, in this example, a web browser executing in a virtual machine that is associated with the second class cannot access any web sites from financial institutions and email providers.

The placement policy of an embodiment may identify the particular virtual machine into which the digital content is to be received by observing application dependencies. Such a policy recognizes that in some instances, it is helpful or even necessary to execute certain applications within a single virtual machine. For example, certain providers of software applications may design their software applications do work together or integrate with each other to a high degree. In this case, it would be advantageous to have applications that are designed to work together to run within a single virtual machine. One way for the placement policy to make this determination would be to ask the user whether an application being installed is dependent upon another application already installed at the client to ensure that both applications may be run in the same virtual machine. While this does expose the notion of a virtual machine to the user, a user need only make a decision of this nature when an application is installed on the client, and thus, this decision may be made by IT administrators or other knowledgeable personal rather than relying upon the end user of the client to make such a decision.

Alternatively, determining whether an application being installed is dependent upon another application may be made programmatically by examining the dependencies during the installation of that application. For example, during the installation of application A, the install process may check if module B is already installed or may require that module B already by installed. In this example, the placement policy may determine then that application A has a dependency with module B and may therefore allow application A to run in same virtual machine as module B.

To illustrate another example, it is initially noted that there need not be a one to one correspondence between a web browser and a web page. For example, a web browser may comprise many tabs, and each tab may display a different web page. In addition, each web browser may have a variety of different plug-in and/or associated programs which may be treated as or considered a separate application. Since a web browser may display multiple web pages of varying trust levels, it is desirable to accommodate a web browser having multiple tabs without requiring that the web pages displayed by each tab reside in the same virtual machine. For example, if a web page contains malicious code, then it would be beneficial to execute it in a different virtual machine from the virtual machine containing the web page of your bank. Therefore, in an embodiment, the placement policy may specify that web page of certain sources should be received in a separate virtual machine. While the user may see a single web browser having two tabs, on the back end this may be implemented in two separate virtual machines that each execute a copy of the web browser and possess one web page to be shown in associated with one tab of the web browser. A practical implementation of web page placement may use a VM per web-site placement policy.

These are merely examples of how a placement policy may be implemented. It is contemplated that actual implementations of a placement policy will be configured based upon the particular needs and concerns of the end user. The containment policy of certain embodiments will now be presented in greater detail.

Containment Policy

The containment policy identifies what network resources and client resources a particular virtual machine can access. Network resources, as broadly used herein, refers to any resource that is external to the client while client resources, as broadly used herein, refers to any resources that is internal to the client. A client resource may include any device, component, and/or data residing on or accessible to the client, such as a digital camera, a network interface card, a digital clock, the current time, files, pictures, and email.

The containment policy is used to ensure that code running within a virtual machine has access to only those resources deemed necessary for normal and intended operation. For example, email attachments should not need access to the Internet (generally speaking), and so they should be opened in a virtual machine that is configured such that it does not have access to the Internet.

In an embodiment, the containment policy may specify what portion of the network that is available or exposed to code executing within a virtual machine. For example, the containment policy may specify that code executing within a particular virtual machine may access no network resources, all network resources, or a subset of the network resources. Thus, a containment policy may specify that code executing within a virtual machine may access a first set of network resources and may not access a second set of network resources. Embodiments may specify what particular network resources are available to a virtual machine using any level of granularity, e.g., only certain types of network resources may be exposed, only certain properties of network resources may be exposed, or only certain portions of the network may be exposed.

In an embodiment, enterprise applications may be grouped into collections. Groupings may be based on a variety of factors, such as job functions or business unit, for example. Each grouping of applications may be executed within a single virtual machine according to an embodiment.

To illustrate the interaction between the containment policy and client resources, the containment policy of an embodiment identifies each client resource accessible to a virtual machine. For example, a containment policy may specify whether code executing in the particular virtual machine can perform one or more of the following actions: access a USB port on the client, perform a copy operation or a paste operation, access a network to which the client is connected, access a GPS device of the client, location information for the client, or tilt information for the client, access a printer or facsimile machine to which the client is connected, and access a digital camera or screen data for the client. Note that these exemplary actions are not meant to provide an exhaustive list, as a containment policy may be used to specify, with particular specificity, which client and network resources may be accessed by code executing within a virtual machine. In this way, if a new client resource becomes available, such as fingerprint scanning device, the containment policy may be updated to reflect the new client resource available to the client.

In an embodiment involving the receipt of executable code at a client, the containment policy may specify that the executable code is denied access to a user file without first obtaining a user's permission to allow the executable code to access the user file. In this way, virtual machines may be configured to allows request permission each time executable code therein access a user file, thereby allowing the user to be informed of the intentions of the executing code and presumably prevent unauthorized access to the user's own files. Such a permission scheme might be implemented naturally as part of the normal user work flow of picking a file to open by running the permission code in a clean protected VM separate from the VM running the untrusted code which is making the request.

To illustrate the interaction between the containment policy and network resources, the containment policy of an embodiment identifies whether code executing in a particular virtual machine can one or more networks accessible to the client. As another example, the containment policy of an embodiment identifies which, if any, objects stored over a network the virtual machine can access. For example, a virtual machine may be restricted to access a specified set of objects or files on a particular server or a particular set of web pages.

In an embodiment, the containment policy may consider any number of factors, including but not limited an identity of the user of the client, a set of properties of the digital content, a physical location of the client, the current time, a holiday schedule, and a set of administrator-specified policy rules. In this way, the containment policy may assign a virtual machine having more restrictions than usual to receive digital content when the digital content is deemed more likely to contain malicious code. For example, it may be deemed likely that digital content contains malicious code when it is received by the client outside of normal business hours, over a holiday, at a time when the client is outside of the user's home or work office, or when the digital content has certain suspicious properties. In this way, the containment policy may assign suspicious digital content to be received in a virtual machine having additional restrictions appropriate for such suspicious digital content.

These examples of how a containment policy may operate and merely illustrative of some examples and are not intended to be an exhaustive list, as actual implementations of a containment policy will be configured based upon the particular needs and concerns of the end user. The persistence policy of certain embodiments will now be presented in greater detail.

Persistence Policy

In an embodiment, the persistence policy identifies whether data stored in a particular virtual machine is persistently stored. The policy grapples with the issue of whether or not to save state created by untrusted code and if so, whether the state should be stored in an isolated manner or merged back into the main file system of the computer. On one hand, to provide a convenient user experience, it may be helpful to persistently store cookies for a web site. On the other hand, it would not be desirable to persistent malicious code, such as a key logger, that was inadvertently introduced into a virtual machine by malware downloaded into and run in the affected virtual machine.

The persistence policy, hand in hand with the placement policy, should be designed to ensure that any potentially malicious code is not persistently stored, or in the alternative, persistently stored in an isolated way. This way, if malicious code, such as a key logger, is persistently stored, and in any future invocation (execution or interpretation), it is invoked (executed) in the context of a possibly new virtual machine instance separate from any other code, thereby nullifying the risk presented thereby.

To illustrate an illustrative persistence policy, in an embodiment only cookies and cache files are persistently stored in a virtual machine in which a web browser executes. Further, the cookies and cache files associated with a particular web site are only inserted to a virtual machine that is intended to execute a web browser displaying that web site. Thus, cookies and a cache file associated with site A would not be inserted into a virtual machine instantiated to run a web browser to display web site B, but would be inserted into a virtual machine instantiated to run a web browser to display web site A.

The above discussion of a persistence policy is exemplary of certain embodiments and is not intended to describe all implementations of a persistence policy, as a persistence policy will be configured based upon the particular needs and concerns of the end user.

Unified Display

Even though there may be a plurality of virtual machines executing at the client, this complexity need not be exposed to the end user of the client. Thus, the end user should be presented visual content generated from each virtual machine executing on the client in a unified manner to present a single, cohesive presentation to the end user of the client. The presentation of the content should be seamless and close to native as possible.

For example, the end user of the client should interact with a web browser that looks like a known web browser, even though the web browser, at the back end, is implemented using a plurality of virtual machines to execute copies of the web browser and different web pages corresponding to each tab of the web browser.

Virtual Machine Forensics and Malware Detection

In an embodiment of the invention, the execution of a process within a VM may be monitored, and when a trigger event occurs (e.g., the process deviates from expected behavior), additional monitoring is initiated, including storing data ("behavior data") describing the real-time events taking place inside the VM. This "behavior data" may then be compared to information about the expected behavior of that type of process in order to determine whether malware has compromised the VM. The behavior data may describe a sequence of actions performed by the process, and this sequence of actions may be compared to information stored in a database or other persistent store to determine whether the behavior of the process executing within the virtual machine is progressing in a normal or deviant manner.

Figure 10:
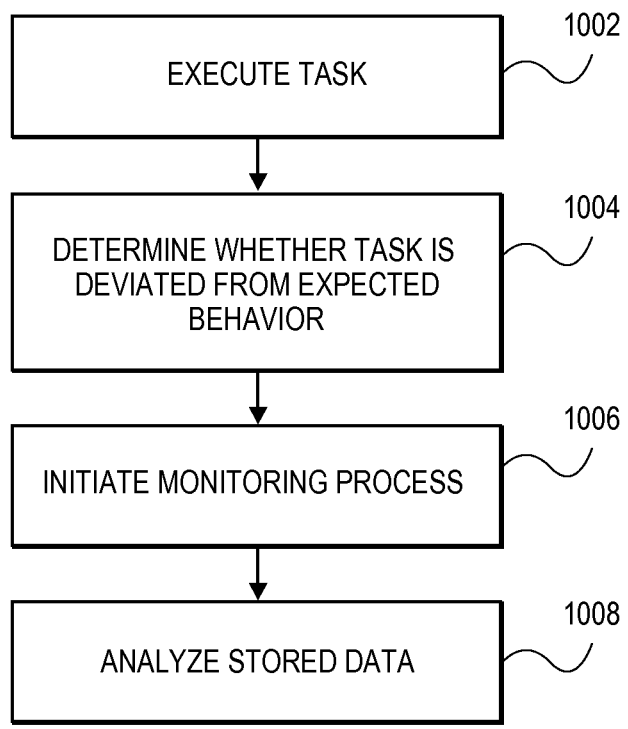
FIG. 10 is a flowchart showing an example process for virtual machine forensics and detection according to an embodiment.

FIG. 10 is a flowchart showing an example process 1000 for virtual machine forensics and detection according to an embodiment. Process 1000 may be implemented by code executing on client 200 of FIG. 2, such as in the hypervisor 210 or a virtual machine such as VM0 230 or a UCVM 260, or in a different module, such as module 236.

In step 1002, a VM is instantiated in response to the creation of a particular process. As described earlier, there may be any number of processes executing in parallel on a client, and any number of processes may execute in a separate VM. When a process is initiated to perform a task, a virtual machine may be instantiated dynamically using a template virtual machine associated with that type of task, and the process may execute within the newly instantiated virtual machine.

In step 1004, a determination is made as to whether the actual behavior of the process during execution has deviated from the expected behavior; for example, a PDF file should not be attempting to connect to an entity via a network connection. In an embodiment, this determination may be made via a multi-tiered analytical approach. Various modules executing at different levels of the system may be capable of detecting behaviors that indicate a potential exploit, and in an embodiment, initiate a monitoring process on the process if deviant behavior is observed. For example, a process may attempt to perform a suspicious action, such as an attempt to download or "drop" one or more files into the OS file system, an attempt to open a network connection (e.g., HTTP or FTP), an attempt to execute code, an attempt to modify user-layer portions of the registry, or an attempt to disable a firewall. An illustrative module of the multi-tiered approach is a user-level module (e.g., a driver) that detects activity occurring at the user layer of the particular VM's operating system. In an embodiment, these user-level modules (drivers) have programming hooks enabling the inspection of communication between various components and/or modules. There may be user mode hooks enabling the inspection of API calls to the operating system along with registry activity, kernel mode hooks enabling the analysis of kernel activity, file system hooks and network hooks to analyze and/or log all network traffic. These hooks allow the determination whether prohibited activity is occurring; for example, privilege escalations, which are utilized by malware to persist on a system.

In an example embodiment, the hooks, or similar interconnections between modules, facilitate the gathering of information, which is subsequently analyzed to determine whether a particular action or occurrence is the system is the result of malware compromising the system. This behavior-based detection inside the guest operating system is based on storing and analyzing information about activity occurring in the micro-VM.

Due to the focused nature of the VM, the step of determining whether a process deviates from expected behavior may be more easily accomplished. This is so because all activity occurring within the VM should be directed towards the achievement of the particular task for which the VM was instantiated. For example, if a process executing within a VM is responsible for providing the content associated with a single tab of a web browser, then actions which are nonstandard for that type of activity performed that are performed by that process may be identified. Thus, if a process responsible for retrieving a web page performs an action not associated with retrieving a web page, such as spawning one or more child processes, attempting to modify the registry, or attempting to disable a firewall, these actions may be identified as deviant behavior.

As another example of a multi-tiered approach, a kernel-level module (e.g., a driver) may detect activity occurring at the kernel layer of the particular VM's operating system. For example, a kernel-level module may detect deviant behavior of a process by detecting that a process performs certain action uncharacteristic for the type of task for which it is assigned, such as a process that attempts to create a process, a process that attempts to modify a kernel-layer portion of the registry, a process that attempts to modify an access control list, or a process that attempts to kill another process.

As another example of a multi-tiered approach, a hypervisor-level module (e.g., a driver) may detect deviant behavior of a process by detecting that a process performs certain action uncharacteristic for the type of task for which it is assigned occurring at the hypervisor layer of the client, such as an attempt to modify page tables, an attempt to access CPU registers, an attempt to modify the BIOS, or an attempt to overwrite the Master Boot Records.

In an embodiment, configurable rules are stored, for example on the host in an XML file, which relate to the behaviors described above, and in an embodiment are specific to each document MIME type. These rules may be set by a user (e.g., an administrator) in a configuration module. Example rules may be: allow behavior, deny behavior, and stop the VM. For example, a user may define a rule that if a registry access is attempted in a VM, then the VM should be stopped. Other, more permissive rules may be utilized as well; for example, if a user desires to gather as much data about potential exploits as possible, then she may configure rules that allow most behaviors to allow the process to run for a longer period within the virtual machine so that additional behavior may be analyzed.

In step 1006, if it has been determined that a particular process has deviated from expected behavior, for example by the Kernel mode module, then a monitoring process is initiated, for example by the Inspection module. By only beginning to monitor processes after a potential exploit has been identified as potentially active, overhead to the system is avoided. Additionally, because of the isolation afforded by the single process/single VM approach, identified malware may be allowed to continue executing so that data related to the malware and the affected process may be stored for later forensic analysis, as will be discussed herein.

In an example embodiment, the monitoring process includes storing behavior data, for example on the host, which describes the potentially affected process and the effects of the potential exploit. In an embodiment, behavior data may comprise a "snapshot" of the VM taken at varying times; for example, the snapshot may comprise data describing the state of the process and the VM, such as all the changes inside the UCVM including file system, memory, registry, network, etc. In an embodiment, this snapshot comprises a succession of "diffs" between states of the system at various points in time that encompass all the changes that have occurred within the micro-VM. Behavior data may, but need not, comprise registry accesses, memory contents, file system modifications, and so on. Example embodiments embed the executable, DLL, or other file(s) that are identified (for example, by an analysis engine) as comprising the malware either within the data comprising the snapshot or elsewhere. By so doing, the particular environment in which the malware operates may be identified.

Example embodiments, in addition to the snapshots or as part of them, continue to record every aspect of the potential malware and the interaction between it and the VM, such as registry accesses, memory stores, network access (e.g., ports opened), processes created and killed, and the like. This data and the snapshots provide data which, along with data relating to the system clock, may later be used to "replay" the attack, as discussed more fully herein. In an embodiment, storage of this data and/or snapshots may be minimized because only a single process is being monitored in the virtualized environment, not an entire operating system with its multitude of overlapping and interrelated processes. In an example approach, the data stored may be encrypted such that only a limited number of people may access it.

In step 1008, at least a portion of the data stored about the potentially affected process and the effects of the potential exploit is analyzed to determine whether in fact the process has been compromised by malware. An example embodiment examines the behavior of the process (running inside the micro-VM); for example, if the process dropped and executed a DLL file inside the UCVM and then invoked ftp.exe, then would be recognized as suspicious behavior. After a detection of "dropping and executing" (e.g., first phase of infection) an embodiment will invoke a tracing technique in which the entire execution trace of the malware is recorded. The GUI highlights the malicious aspect and the drill down view stores the full details, as discussed herein.

In some implementations, process 1000 can include fewer, additional and/or different operations. In other examples, only one or some subset of these operations may be included, as each operation may stand alone, or may be provided in some different order other than that shown in FIG. 10. For example, in an embodiment, steps 1004 and 1006 may be performed in parallel if sufficient resources are available.

Malware Forensics Graph

According to an embodiment, the behavior data stored (e.g., as part of the monitoring approach described in the previous section) describing the affected process, the potential malware and the status of the VM may be utilized to create and populate a graph or mapping that shows the activities occurring around the exploit. In one example, the behavior data stored is sufficient to allow a malware attack to be "replayed" in a graphical manner similar to replaying a video of an event.

Figure 11:
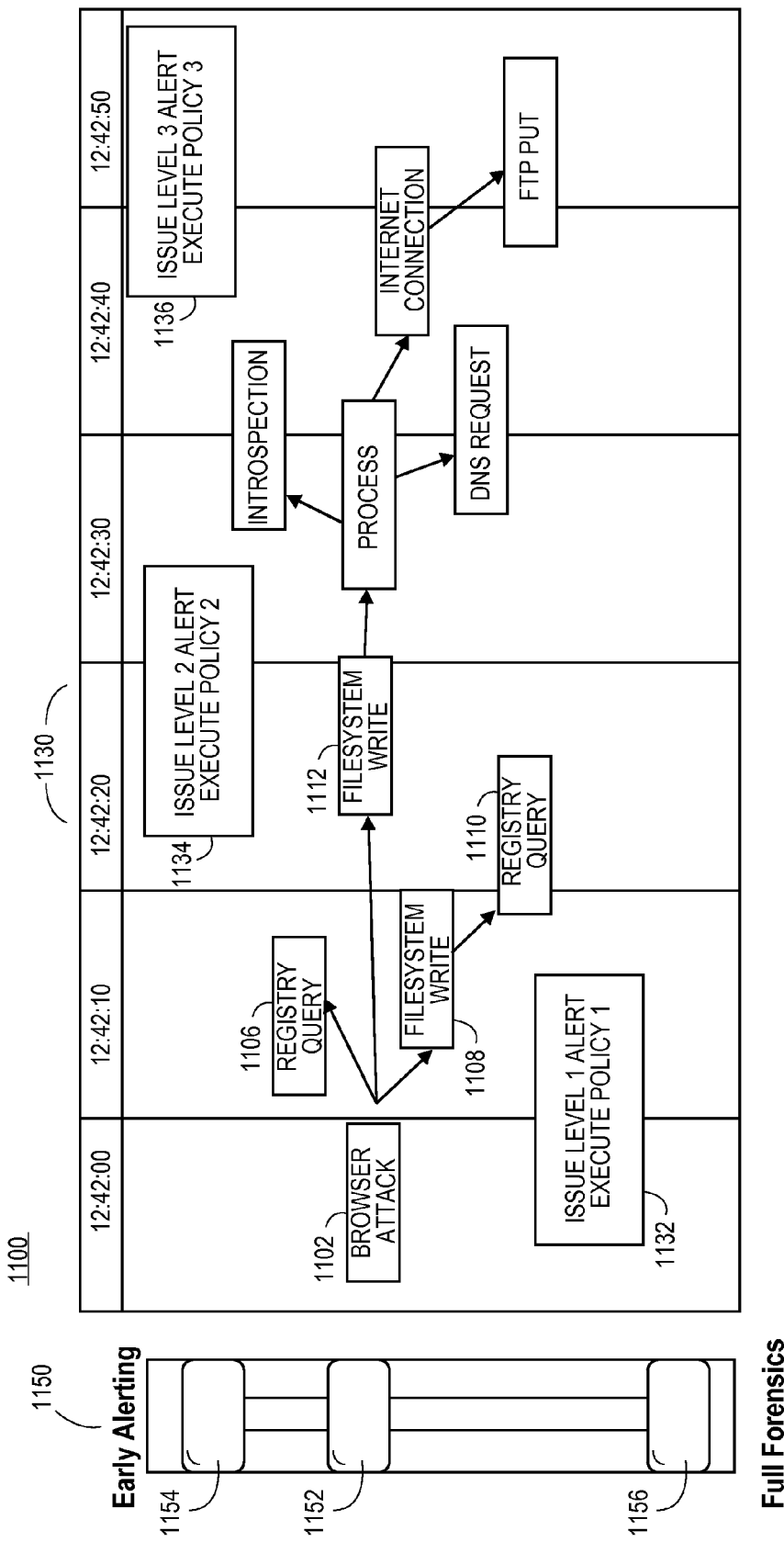
FIG. 11 is an illustration of an example process flow graph according to an embodiment.

FIG. 11 is an illustration of an example process flow graph 1100 according to an embodiment. The process flow graph 1100 may be generated in real time as all the volatile and non-volatile information related to the potential malware attack is saved and analyzed, or later based on the stored information. Volatile information may include data such as memory accesses and values stored in memory, CPU register accesses, and so on. Non-volatile information may include data that is stored on the client, for example in the file system of the OS executing in the VM. Examples may be files that are "dropped" by an exploit or activities that are captured in a log written to a file system. By storing this information as the malware is populating, the attack may be traced and replayed back at a later time.

As a result of monitoring the behavior of entities executing in the VM and storing data as described earlier, time-based nodes 1102-1112 may be created in graph 1100 where the nodes 1102-1112 represent activity that has been monitored and data describing the activity stored and analyzed. The nodes may be correlated to time by in one example storing the time on the client's system clock such activity was monitored. Correlating the activities with the time on a system clock allows the malware attack to be replayed as it occurred on the client.

Turning to FIG. 11, sample node 1102 is generated based on an event; for example, the earliest activity monitored on the client after a process has been determined to deviate from expected behavior. In this example, node 1102 comprises a "behavior profile" which describes the nature of the exploit along with related data. In this example, node 1102 reflects the determination that this is a "Browser Attack." In some embodiments, the logo of the application being monitored is displayed for ease of identification. Along with the type of attack, node 1102 may display additional information of the profile such as the process name that is implicated in the activity represented by node 1102. Other information may comprise registry keys, file system locations, and the like. The time of the identification may be displayed, for example based on the system clock. Information related to the event represented by the node that is not displayed, for example to save space, may be displayed by, for example, double-clicking the node, using a mouseover display, or designating a separate part of the graph to display the information when the node is selected. This information may comprise any and all data stored that is related to the event or the system at the time of the event, such as CPU ID implicated, whether the VMX instruction is enabled, etc.

A severity of the activity may be displayed, for example in text or graphically, such as indicating a level of severity via displaying node 1102 in a particular color. In an example, the severity is determined via a combination of pre-determined conditions that are deemed to be malicious and also via correlating multiple chains of events. These levels of severity may be defined by a user and stored in a configuration file, or may be classified based upon a combination of information; for example whether the file system was written to, whether the MBR/VBR was modified, etc. The configuration may indicate, for example, that a certain filename written to a particular section of the file system followed by opening a network connection to a particular address indicates a high severity.

Nodes 1102-1112 may be predefined or generated dynamically in response to the monitoring and analyzing steps. While in an example, all nodes are dynamically created based upon conditions occurring in the micro-VM, there may exist certain conditions which when detected, result in the creation of a node that has been predefined in the sense that it is always created when the certain conditions are detected. In an example, if there is a drop and file system write and then the dropped file attempts to create a process through an API call, a particular predefined node is created based upon that identified behavior.

The dynamically generated nodes may be based on pre-requisites that are behaviorally based, such as a PDF attempting to connect to a network or trying to manipulate the master boot record (MBR). Turning back to FIG. 11, after the event correlated with node 1102, the monitoring approach captured a registry query event that is unexpected, and a node 1106 is created in response. If this particular registry query is predefined in a database (e.g., the specific query to a specific portion of the registry is already known), then the node may be populated with certain predefined information. If this particular registry query event is not located in a database, then the node is dynamically generated based on the data associated with the event. In the case of node 1006, information displayed includes the type of event (registry query) and the affected location along with the date and time, although other information may also be displayed as discussed earlier.

Other events in the current example generate additional nodes. After the registry query 1106, a file system write event was monitored and a node 1108 created, followed by another registry query event happened and a node 1110 created, followed by another file system write event for which a node 1112 was created. The nodes 1102-1112 are in one example plotted on a horizontal axis 1130 based on time, such as the system clock described earlier.

While these nodes represent individual events monitored as a result of detecting unexpected behavior, in the case of sophisticated malware, there may be hundreds, even thousands of such events, and they may happen with such rapidity that a graph of the events would be difficult to review because of the visual noise created by many nodes with detailed information. In an embodiment, a pattern of events may be treated as a single event and a series of events may be interpreted as a single event. Multiple events may be represented as a single node (an "UI correlation node"), which may lead to another node that is also representative of multiple events. In an embodiment, this is accomplished by comparing a series of nodes to information about known malware and how that known malware operates. In an example, a UI correlation node will encompass the previous and next nodes and will correlate based on the type/category of node. It may also correlate based on count; for example, a node with multiple similar outbound nodes can be correlated into a single node.

In an example, selected multiple events are correlated, in an example based on the type and/or category of node, and visually combined or collapsed into a single node (or state) in a way that provides effective commentary on what the collection of events means. In the example of FIG. 11, reference may be made to a database of known malware events to determine that the events represented by nodes 1102-1112 are part of a known sequence of events. In response, one embodiment collapses nodes 1102-1112 into a single node. A sequence of collapsed nodes is envisioned in an example. In one example, the collapsed node may be double-clicked or otherwise operated on to expand the collapsed node into the multiple nodes comprising it. In an example, a node with multiple similar outbound nodes can be combined into a single node.

While certain states (i.e., collections of events represented by nodes) may be predetermined, for example by reference to a database, in other example embodiments the states are dynamically organized based on behavior. Reference may be made to a collection of data to determine that certain collections of events represent malware-related behavior. For example, there may be a file system write event in which a temporary file is dropped into a particular directory, then the temporary file is attempted to be loaded as a kernel driver, then a network socket is opened on a particular port. While these are all separate events and may be represented by individual nodes, each with its own severity and collection of information about the events, instead the collection of events may be represented by a single node based on a dynamic evaluation of the collection of behaviors. Through this example approach, a collection of events may be assigned a severity and malware may be identified in a more granular fashion with a particular confidence level.

In an example, various "confidence levels" may be defined by policy, which policies may be editable, for example by an administrator. An example policy may allow the assigning of various confidence levels to certain types of events. For example, a policy may indicate that when a "drop and execute" event is detected by the forensics techniques described herein, that a particular confidence level (e.g., "high", "medium", "low") may be assigned to the event. Other policies may then be implemented to take action based upon the detection of an event of a particular confidence level. For example, if an event occurs that is associated with a "high" confidence level, then an action such as stopping the micro-VM may be invoked.

In an embodiment, policies defining confidence levels and the responses to said confidence levels are defined in an XML file. For example, a list of behaviors (e.g., dropping of malware, file system write, attempted escalation of privilege, network activity) is defined along with the action to be taken (e.g., stop VM, halt network traffic to the VM, deny API calls, etc.). Various users may want to take different actions based on the detected confidence level of an event. For example, a standard user may want to take full advantage of the protection offered by the techniques described herein and stop the micro-VM at the first detection of a high confidence event (as defined by policy). On the other hand, an administrator merely may want to be notified that an event occurs of any confidence level so that the administrator can observe the malware infection in real time to see what happens.

In one example, a user interface element such as a policy editor 1150 may be implemented to select a particular level of protection. While a policy editor 1150 is depicted in FIG. 11, it is understood that any type of user interface element may be utilized, as well as a direct selection of a level of protection; for example, by typing in a numeric percentage in a dialog box or in a configuration file. In the policy editor example, a user may adjust a slider bar 1152 on a range between "early alerting" 1154, which would for example immediately stop the micro-VM (or deny API calls, or deny network traffic, etc.) at the first detection of an event of a particular confidence (again, which may be defined by policy, such as an administrator editing an XML file), and "full forensics" 1156, which would alert the user of an event of a particular confidence level and gather the entire attack cycle for further analysis. In this example, the policy editor 1150 is a manifestation of different policies that may be defined and acted upon based upon events detected via the techniques described herein. Each policy will have its own settings (e.g., per node) and have actions like "ALLOW", "DENY", "STOP-MICROVM".

In an example embodiment, the data used to create the nodes may be used to step backwards and forwards in time to recreate the graph 1100 to observe the activities and map out the lifecycle of particular malware in a reliable manner. In an example, controls will be provided to allow the "playing" of the VM; for example, a slider may be manipulated to go to a point in time where the VM was not compromised, and then a "play" button may be activated so the nodes are created as if watching a movie. The node creation and mapping may be stepped through to observe what happened and when. If the data is encrypted as described earlier, example embodiments may restrict the viewing of the graph and the potential "playback" to certain personnel having an access credential.

In an embodiment, the particular events comprising the graph of nodes may be utilized to create a "fingerprint" of the phases of the malware, or the "map" of the malware. The fingerprint of the states may be created using a hash function or similar approach known in the art, such as XML. In an example embodiment, this fingerprint may be created on-the-fly as the malware infection is occurring, and the characteristics embodied by the fingerprint are sent to a central database which then compares the fingerprint to a predefined database, for example of fingerprints taken from other malware behavior from previous infections. In an example based upon FIG. 11, a fingerprint of nodes 1102-1112 may be created and sent to a central location for comparison with fingerprints created from maps of nodes resulting from known malware infections. If a match is detected, then notification may be transmitted from the comparison location (e.g., a server) back to the forensics engine and an alert 1132 may be displayed or other action taken depending on what policies have been defined.

Malware Determination Heuristics

Example embodiments utilize heuristic techniques in order to determine whether a process executing in a VM is exhibiting behavior that may be characterized as abnormal or unexpected. This behavior may be considered, in one embodiment, a "trigger event." As a result of identifying a trigger event (e.g., the process deviates from expected behavior), additional monitoring is initiated, including storing data about the real-time events taking place inside the VM.

A heuristic or set of heuristics in example approaches may comprise an algorithm that is determined from observation of existing applications as well as malware implementations. Data collected from the observation may be analyzed, indexed and stored in a database, which database is then used to define "normal" or expected behavior for a process associated with an application.

The heuristics of example approaches comprise a combination of certain events that taken together are reliable enough to label particular behavior as unexpected. Examples may comprise a particular process attempting to spawn a child process, or if a Java process attempts to invoke particular APIs. The heuristics may be predefined so that activity from a process may be compared to a set or subset of predefined heuristics.

According to an embodiment, the approaches described herein, such as the various examples of heuristics, as well as other approaches, are envisioned as being performed in the context of a host executing at least one micro-virtual machine (micro-VMs), where instead of virtualizing multiple operating systems, the micro-VM (via a micro hypervisor or microvisor) isolates (via hardware and/or software) each application task within a single running OS in a lightweight micro-VM. In an embodiment, a microvisor (or a hypervisor used to instantiate special purpose virtual machines) uses hardware virtualization to guarantee that micro-VMs are isolated from the OS and each other. In this way, each untrustworthy task is automatically, instantly, and invisibly isolated within a micro-VM that has no access to enterprise data or networks and which cannot modify the desktop. In one embodiment, a group of micro-VMs may be a plurality of virtual machines executing in a computing environment, where each task executes in a separate virtual machine instantiated for the particular task.

Figure 12:
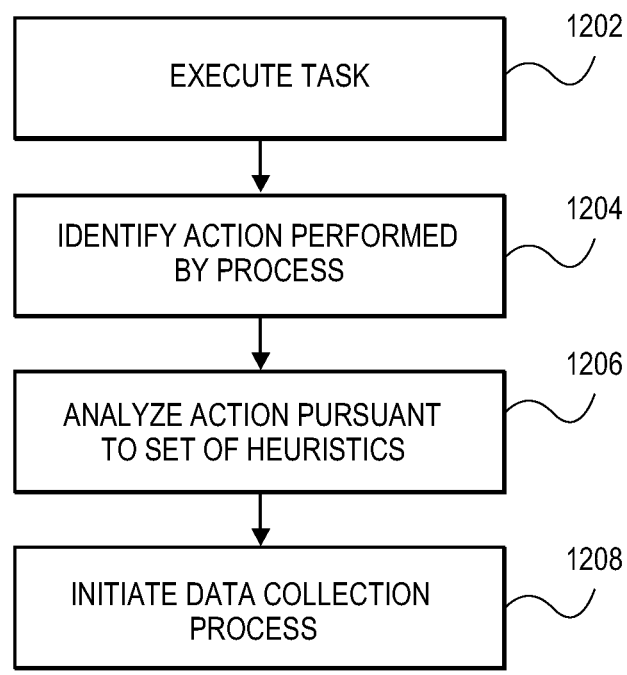
FIG. 12 is a flowchart showing an example process for virtual machine forensics and detection according to an embodiment.

FIG. 12 is a flowchart showing an example process 1200 for virtual machine forensics and detection according to an embodiment. Process 1200 may be implemented by code executing on client 200 of FIG. 2, such as in the hypervisor 210 or a virtual machine, such as VM0 230 or a UCVM 260, or by a different module or system.

At step 1202, a VM is instantiated in response to the creation of a particular process. As described earlier, there may be any number of processes executing in parallel on a client, where each process may execute in a separate VM.

At step 1204, an action performed by a process executing in a VM is identified. For example, a kernel-level module may monitor a list of processes in order to determine when a new process is initiated. The kernel-level module may store information about the new process, e.g., creator, ID, and the like. A user-level module may also monitor the status of various events occurring in an OS executing in a VM. A hypervisor-level module may monitor the status of various events occurring at the VM level.

At step 1206, the action identified in step 1204 is analyzed in relation to a particular set of heuristics to determine whether a "trigger event" has occurred. To illustrate one example of heuristic techniques, assume a PDF file is opened in a VM. As described earlier, various modules perform background monitoring tasks, and in this example, the kernel-level module monitors the "Acrobat" process spawned when the PDF file was opened. The kernel-level module also monitors any child processes started by the "Acrobat" process and stores data describing a list of files that the parent "Acrobat" process (and any child processes) modifies along with a list of any drivers/services/etc. installed by the process or processes. In this example, the "Acrobat" process drops a file and starts it as a new process.

As a result of the background monitoring, two sets of information have been created. First, a set of modified files, and second, a set of files started as a process. By taking the intersections of the two sets, a list of files that have been dropped and started as processes is generated. The intersection may be considered as a list of static entries, out of which a certain number have become "active." This intersection identifies any files that have been dropped by the potential exploit. Using a similar approach, malware that has been added to the registry may be detected using similar intersection logic.

At step 1208, in response to the trigger event, a heightened monitoring process, in some embodiments comprising a data collection process, is initiated.

Various other heuristics may be used by other embodiments. In one illustrative heuristics, malware is identified as it attempts to inject code into a currently-executing process inside the virtual machine, for example by the various modules performing background monitoring tasks as described above. This may occur when malware attempts to persist by injecting code into a new browser tab process after the malware has compromised the system. If this activity is detected, then this may be treated as a trigger event.

Another example heuristic is detecting when a file that has been modified attempts to invoke an executable. In one embodiment, if the attempt by a file to invoke an executable occurs within a specified amount of time from when the file invoking the executable was modified, then this action may be treated as a trigger event.

Another example heuristic is identifying an attempt to load a modified DLL or system file. This activity may be performed by malware in a post-exploitation phase. In one embodiment, if the attempt to upload the DLL file or system file occurs within a specified amount of time from when the DLL file or system file was modified, then this action may be treated as a trigger event.

Another example heuristic is detecting an attempt by an executing process to modify (e.g., overwrite) a master boot record (MBR) and/or volume boot record (VBR). If this activity is detected, then this may be treated as a trigger event.

Another example heuristic is detecting an attempt by malware to drop a file (such as an executable, a system file, a DLL, and the like) and then delete itself. The malware may comprise an executable or other file, such as a downloaded program. This malware entity may execute, perform a task such as dropping one of the aforementioned types of files, and attempt to delete itself to avoid detection by virus scanners and the like. If this activity is detected, then this may be treated as a trigger event.

Another example heuristic is detecting and logging network communications. The type of network communication may be specified, for example by a configuration file or other indicator in a database. Various types of network activity may be only in- or out-bound requests, DNS requests (e.g., to particular DNS servers or to a defined class of DNS servers such as all within a particular country), the IP address of an entity sending in-bound data over the network, a particular network port being opened or used for communication, and a specific protocol being utilized, such as HTTPS or FTP. Thus, if this activity is detected, then this may be treated as a trigger event.

Another example heuristic is detecting an attempt to access or change the kernel memory of a guest operating system executing in a virtual machine. If this activity is detected, then this may be treated as a trigger event.

Another example heuristic is detecting an attempt to access Windows tokens. If this activity is detected, then this may be treated as a trigger event.

Another example heuristic is detecting an attempt by malware to enumerate processes and/or drivers executing inside a virtual machine. This is commonly used by malware to identify targets for attacks. Thus, if this activity is detected, then this may be treated as a trigger event.

Another example heuristic is detecting an attempt by an executing task to access a physical drive (such as a hard drive, DVD drive, or solid state drive) to which the executing task has write permissions (for example, a drive with a mount point such as \Device\Harddisk0\Dr0). If this activity is detected, then this may be treated as a trigger event.

Another example heuristic is detecting an attempt to load a driver inside a virtual machine. If this activity is detected, then this may be treated as a trigger event.

Another example heuristic is detecting an attempt to clear system logs; for example, Windows event logs. If this activity is detected, then this may be treated as a trigger event.

Another example heuristic is detecting an attempt to change the CR0 WP flag or its equivalent. The CR0 control register in the x86 series of processors has various control flags that modify the basic operation of the processor. One of the flags concerns determines whether the CPU can write to pages marked read-only. Kernel mode malware needs to change this flag to make pages writable to execute code and thereby overwrite operating system data structures. Thus, if this activity is detected, then this may be treated as a trigger event.

Another example heuristic is detecting whether a process has accessed registers being utilized by a virtualized system. Accessing registers being utilized by a virtualized system may be performed by some virtualized rootkits for purposes of taking control of a machine by migrating the running operating system into a virtual machine. Thus, if this activity is detected, then this may be treated as a trigger event.

Another illustrative heuristic is detecting whether a file infector has been dropped inside a UCVM. This may be performed by identifying the type of files being modified in a given system after the introduction of a particular suspected file (e.g., a suspected malware dropper) and determining what percentage of those altered files are of a certain type, such as executables or DLLs. If a threshold percentage of files that are modified are of a particular type (e.g., either DLLs/EXEs), then the suspected file is classified as PE infector. This threshold percentage may be dynamically calculated based upon an acceptable level of threat, as described earlier, or may be predetermined by a user or read from a configuration file.

Another example heuristic is detecting an attempt to modify or manipulate a system service. For example, malware may attempt to stop an anti-virus service or the firewall service. If such an attempt is detected, then this may be evidence of a trigger event.

Another example heuristic is generating and storing hashes of all files that are newly created in the file system of the micro-VM. Newly created files may be created post-exploit by malware. In an example, once it has been determined that a process deviates from its expected behavior, all files created in the file system of the VM in which the process is executing are processed through a hashing function that creates a unique identifier for each file. Each unique identifier may be stored and can be used later to identify the file associated with the file identifier. For example, the hash may be communicated to a database of hash values along with the identity and other details about the particular file. This information may be used to deduce and subsequently identify the malware.

Storing Malware Manifest Data in a Central Repository

Once malware is detected executing in a virtual machine running on a particular client, the client may notify an entity (a "central repository") responsible for overseeing the operation of many clients that malware has been detected on that client. Indeed, in certain embodiments, each client may even provide to the central repository a copy of the malware itself and any information necessary to safely recreate the execution of the malware in a controlled environment. A client may notify the central repository of the malware in an automated manner, i.e., without explicit instruction from a user.

Notifying the central repository in an automated manner is advantageous for a variety of reasons. The information stored and maintained in the central repository provides visibility into the actual activity transpiring within a virtual machine infected with malware. By analyzing this information collected from a plurality of clients, vulnerabilities present across an enterprise's deployed clients may be discovered and appropriate countermeasures may be enacted. For example, important threat actors involved in an enterprise wide infection may be identified (which may, but need not, involve a reverse DNS lookup so that the network location of the attacker may be identified) and this information may be used to configure and deploy automated responses, such as an automated intrusion detection system (IDS)/intrusion prevention system (IPS), a firewall, or creating anti-virus signatures based on this information. By reviewing the data stored in the central repository, one can better understand the nature of the malware, e.g., one can determine how many clients were affected by the malware, when the malware was introduced, where did the malware come from, and which type of users are being attacked by particular types of malware.

FIG. 1 is a flowchart illustrating the steps of a client informing a central repository according to an embodiment of the invention. For purposes of providing a concrete example, the steps of FIG. 1 shall be explained below with reference to FIG. 2.

In step 110, malware is detected executing within a virtual machine running on a client. For example, malware may be detected executing within virtual machine 262 running on client 200 using the techniques discussed above with respect to FIGS. 10 and 11. To provide a concrete example, the steps of FIG. 1 below will be explained with reference to an example involving malware being detected in virtual machine 262 in step 110.

In an embodiment, the software module that detects the malware executing within virtual machine 262 may be software module 236. Alternately, a software module executing with a secure virtual machine on client 200 may detect the presence of malware executing in another virtual machine.

In step 120, a software module, without manual instruction, sends information (termed "malware manifest data") about the malware detected executing within virtual machine 262 to a central repository over a network. In an embodiment, the software module that sends the malware manifest data to the central repository may execute within a host operating system, such as operating system 232. For example, the software module that sends the malware manifest data to the central repository may be software module 236. Alternately, the software module that sends the malware manifest data to the central repository may execute with a secure virtual machine on client 200.

The central repository is meant to broadly cover any single logical entity for storing data. The central repository itself, while being a single local entity, may comprise a plurality of physical computer systems across different physical locations for fault tolerance and performance reasons. For example, the central repository may include a database maintained using a RAID configuration. The central repository may support multiple interfaces for interacting with the data stored therein; for example, the central repository may support receiving and storing data over a wired or wireless network using a plurality of different protocols and may enable users to access and interact with the central repository and the data stored therein using many protocols as well, including but not limited to using a web browser. Thus, the central repository may be implemented as a set of related software services which may include a web server and a database management system.

Malware manifest data is data that informs the central repository that malware is executing with a particular virtual machine running on a particular client. In an embodiment, malware manifest data may include a copy of the detected malware, such as, but not limited to, a binary file of detected malware. Malware manifest data may also identify or include a set of files that have been modified by the malware. In this way, the malware manifest data evidences any modifications made to files by the malware within virtual machine 262. If the malware performs any temporary modifications to a file, these temporary modifications may also be identified by or comprised within the malware manifest data. For example, malware manifest data may comprises all versions, including temporary versions, of any files within virtual machine 262 written to, updated by, or even accessed by the malware.

In some embodiments, malware manifest data may also include information that identifies all actions performed by the malware within the virtual machine. In such an embodiment, if the malware attempted to initiate a network connection or access certain restricted areas of memory, the malware manifest data would identify such actions took place and the circumstances surrounding each action.

Optionally, malware manifest data may include an image of virtual machine 262. The image of virtual machine 262 would include the contents of memory and data persistently stored on disk for virtual machine 262. Additionally, malware manifest data may, but need not, further comprise all information necessary to recreate virtual machine 262 on another computer system. Such information may include an image of virtual machine 262, but may include different or additional information, such as information identifying a template used to instantiate virtual machine 262 and/or information identifying the installed software and service packs installed in virtual machine 262.

Malware manifest data may also optionally comprise information describing or identifying why virtual machine 262 was instantiated or what software was intended to be executed or interpreted within virtual machine 262. Such information is helpful in identifying how the malware was introduced into virtual machine 262 specifically and client 200 more generally.

Malware manifest data may also optionally include information identifying where files modified by the malware executing in virtual machine 262 are physically stored on persistent storage (such as a flash drive or a hard-disk drive) in client 200. In an embodiment, this may be performed by creating and maintaining a hard link to a file anytime the file is modified by the malware executing in virtual machine 262. Using the hard link, if a particular file is deleted or modified by malware executing in virtual machine 262, a copy of the file prior to being modified or deleted may be found on persistent storage in client 200. Hard links do not impact performance in any meaningful manner as they are optimized for performance.

In an embodiment, software module 236 may suspend the execution of virtual machine 262 prior to causing the malware manifest data to be sent to the central repository. Alternately, software module 236 may permit the malware to continue execution within virtual machine 262 while the malware manifest data is sent to the central repository.

In an embodiment, malware manifest data may be sent in an encrypted fashion to the central repository. For example, a password, public key/private key combination, a shared secret, and the like may be used to securely send the malware manifest data from client 200 to the central repository.

While embodiments have chiefly been described herein as operating according to a push model, other embodiments may operate according to a pull model. For example, the central repository may periodically poll client 200 to determine if client 200 has any additional malware manifest data, and if so, may retrieve such data from client 200.

In step 130, upon the central repository receiving the malware manifest data, the central repository stores the malware manifest data. The central repository may receive malware manifest data from a variety of different clients. Such malware manifest data may be sent over a wired network or a wireless network. Each set of malware manifest data which the central repository receives may be different and distinct from any other set of malware manifest data received sent by other clients.

In an embodiment, the central repository may provide an interface which allows a user to extract the malware from a set of malware manifest data. Users may analyze the malware which has been extracted from the malware manifest data to ascertain infection patterns and diagnose vulnerabilities in the clients reporting the malware manifest data.

Each set of malware manifest data may identify the set of operating conditions for the virtual machine in which the malware was detected. In an embodiment, after identifying a set of particular operating conditions from a set of malware manifest data, a user (such as an administrator or other user of the central repository) may cause a new virtual machine to be instantiated which possesses the same set of operating conditions as the virtual machine on client 200 in which the malware was originally detected. The malware may be extracted from the set of malware manifest data and injected into the new virtual machine. This allows another use to execute the extracted malware in a safe environment (on a different machine than client 200) for study and observation.

In an embodiment, the central repository may establish and enforce a policy that the malware manifest data is treated as untrusted data which is unable to be executed or interpreted within a host operating system. Approaches for handling untrusted data in this manner as discussed above and in U.S. patent application Ser. No. 13/419,345, filed Mar. 13, 2012, entitled "Seamless Management of Untrusted Data Using Virtual Machines," the disclosure of which is hereby incorporated by reference for all purposes as if fully set forth herein.

Hardware Mechanisms

Figure 9:
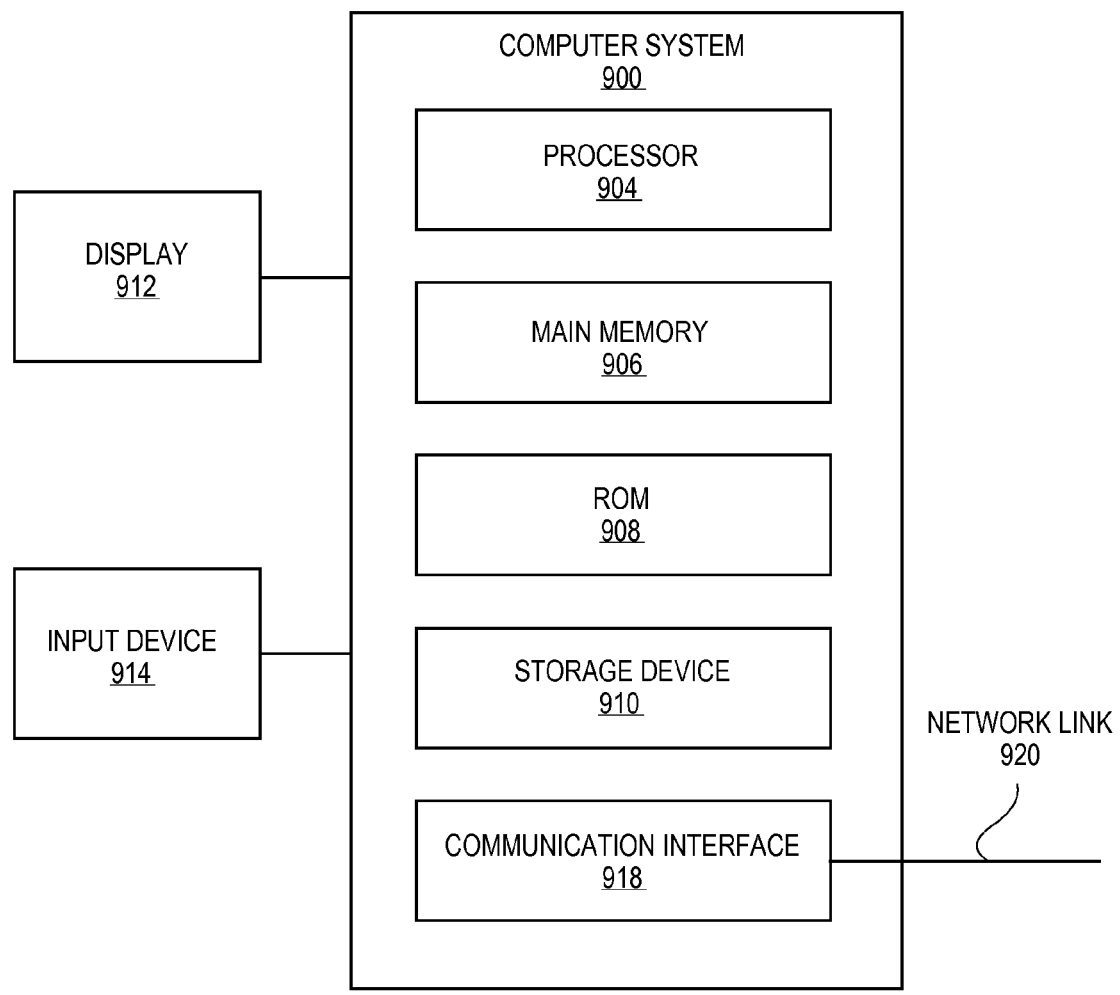
FIG. 9 is a block diagram that illustrates a computer system upon which an embodiment of the invention may be implemented.

In an embodiment, client 200 of FIG. 2 may be implemented on, include, or correspond to a computer system. FIG. 9 is a block diagram that illustrates a computer system 900 upon which an embodiment of the invention may be implemented. In an embodiment, computer system 900 includes processor 904, main memory 906, ROM 908, storage device 910, and communication interface 918. Computer system 900 includes at least one processor 904 for processing information. Computer system 900 also includes a main memory 906, such as a random access memory (RAM) or other dynamic storage device, for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device for storing static information and instructions for processor 904. A storage device 910, such as a magnetic disk or optical disk, is provided for storing information and instructions.

Computer system 900 may be coupled to a display 912, such as a cathode ray tube (CRT), a LCD monitor, and a television set, for displaying information to a user. An input device 914, including alphanumeric and other keys, is coupled to computer system 900 for communicating information and command selections to processor 904. Other non-limiting, illustrative examples of input device 914 include a mouse, a trackball, or cursor direction keys for communicating direction information and command selections to processor 904 and for controlling cursor movement on display 912. While only one input device 914 is depicted in FIG. 9, embodiments of the invention may include any number of input devices 914 coupled to computer system 900.

Embodiments of the invention are related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement embodiments of the invention. Thus, embodiments of the invention are not limited to any specific combination of hardware circuitry and software.

The term "machine-readable storage medium" as used herein refers to any tangible medium that participates in storing instructions which may be provided to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Non-limiting, illustrative examples of machine-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or cartridge, or any other medium from which a computer can read.

Various forms of machine readable media may be involved in carrying one or more sequences of one or more instructions to processor 904 for execution. For example, the instructions may initially be carried on a magnetic disk of a remote computer. The remote computer can load the instructions into its dynamic memory and send the instructions over a network link 920 to computer system 900.

Communication interface 918 provides a two-way data communication coupling to a network link 920 that is connected to a local network. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through a local network to a host computer or to data equipment operated by an Internet Service Provider (ISP).

Computer system 900 can send messages and receive data, including program code, through the network(s), network link 920 and communication interface 918. For example, a server might transmit a requested code for an application program through the Internet, a local ISP, a local network, subsequently to communication interface 918. The received code may be executed by processor 904 as it is received, and/or stored in storage device 910, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory machine-readable storage mediums storing one or more sequences of instructions for updating a central repository with information about malware resident upon a computer system, which when executed by one or more processors, causes:

upon detecting the malware executing in a virtual machine, a software module, without manual instruction, sending malware manifest data to a central repository over a network, wherein the malware manifest data further comprises all versions, including temporary versions, of any files written to, updated by, or accessed by said malware, wherein the malware manifest data comprises a copy of the malware and data identifying or comprising a set of files infected by the malware.

2. The one or more non-transitory machine-readable storage mediums of claim 1, wherein the malware manifest data further comprises information identifying all actions performed by the malware within the virtual machine.

3. The one or more non-transitory machine-readable storage mediums of claim 1, wherein the malware manifest data further comprises an image of the virtual machine, wherein the image includes the contents of memory and data persistently stored on disk for the virtual machine.

4. The one or more non-transitory machine-readable storage mediums of claim 1, wherein the malware manifest data further comprises all versions of any files within the virtual machine written to or updated by the malware.

5. The one or more non-transitory machine-readable storage mediums of claim 1, wherein the malware manifest data further comprises all information necessary to recreate the virtual machine on another computer system.

6. The one or more non-transitory machine-readable storage mediums of claim 5, wherein the information necessary to recreate the virtual machine comprises information identifying a template used to instantiate the virtual machine.

7. The one or more non-transitory machine-readable storage mediums of claim 1, wherein the malware manifest data further comprises information describing why the virtual machine was instantiated.

8. The one or more non-transitory machine-readable storage mediums of claim 1, wherein the malware manifest data further comprises information identifying where files in the virtual machine are physically stored on disk.

9. The one or more non-transitory machine-readable storage mediums of claim 1, wherein the software module executes within a host operating system external to the virtual machine.

10. The one or more non-transitory machine-readable storage mediums of claim 1, wherein activity in the virtual machine is suspended prior to the software module sending the malware manifest data to the central repository.

11. The one or more non-transitory machine-readable storage mediums of claim 1, wherein the malware is allowed to execute in the virtual machine at the same time as the software module sends the malware manifest data to the central repository.

12. One or more non-transitory machine-readable storage mediums storing one or more sequences of instructions for maintaining a central repository that stores information about malware executing on one or more of a plurality of computer systems, which when executed by one or more processors, causes:

receiving, over a network from at least two computer systems, distinct sets of malware manifest data which each indicate that malware has been detected on a virtual machine executing on a computer system from which the malware manifest data was sent, wherein the malware manifest data further comprises all versions, including temporary versions, of any files written to, updated by, or accessed by said malware, wherein the malware manifest data comprises a copy of the malware and data identifying or comprising a set of files infected by the malware; and storing the malware manifest data in the central repository.

13. The one or more non-transitory machine readable storage mediums of claim 12, wherein execution of the one or more sequences of instructions further causes: extracting the malware from a set of malware manifest data.

14. The one or more non-transitory machine readable storage mediums of claim 12, wherein execution of the one or more sequences of instructions further causes:

after identifying a set of particular operating conditions from a set of malware manifest data, instantiating a new virtual machine possessing the particular set of operating conditions;

extracting the malware from the set of malware manifest data; and after injecting the extracted malware into the new virtual machine possessing the particular set of operating conditions, executing the extracted malware in the new virtual machine.

15. The one or more non-transitory machine readable storage mediums of claim 12, wherein storing the malware manifest data in the central repository comprises:

establishing and enforcing a policy that the malware manifest data is treated as untrusted data which is unable to be executed or interpreted within a host operating system.

16. The one or more non-transitory machine-readable storage mediums of claim 12, wherein execution of the one or more sequences of instructions further causes:

analyzing the distinct sets of malware manifest data to identify a network address of a threat actor involved in a computer attack against the plurality of computer systems.

17. The one or more non-transitory machine-readable storage mediums of claim 12, wherein execution of the one or more sequences of instructions further causes:

configuring (a) an automated intrusion detection system (IDS)/intrusion prevention system (IPS) or (b) a firewall or establishing one or more anti-virus signatures using information obtained from analyzing the distinct sets of malware manifest data.

18. An apparatus for updating a central repository with information about malware resident upon a computer system, comprising:

one or more processors; and one or more computer-readable medium storing one or more sequences of instructions, which when executed by the one or more processors, cause:

upon detecting the malware executing in a virtual machine, a software module, without manual instruction, sending malware manifest data to a central repository over a network, wherein the malware manifest data further comprises all versions, including temporary versions, of any files written to, updated by, or accessed by said malware, wherein the malware manifest data comprises a copy of the malware and data identifying or comprising a set of files infected by the malware.

19. The apparatus of claim 18, wherein the malware manifest data further comprises all information necessary to recreate the virtual machine on another computer system.

20. The apparatus of claim 18, wherein the malware manifest data further comprises an image of the virtual machine, wherein the image includes the contents of memory and data persistently stored on disk for the virtual machine.

* * * * *